United States Patent
Chiang

(10) Patent No.: US 7,096,311 B2
(45) Date of Patent: Aug. 22, 2006

(54) UPDATING ELECTRONIC FILES USING BYTE-LEVEL FILE DIFFERENCING AND UPDATING ALGORITHMS

(75) Inventor: Ying-Hsin Robert Chiang, San Jose, CA (US)

(73) Assignee: InnoPath Software, Inc., Sunnyvale, CA (US)

( * ) Notice: Subject to any disclaimer, the term of this patent is extended or adjusted under 35 U.S.C. 154(b) by 670 days.

(21) Appl. No.: 10/261,153

(22) Filed: Sep. 30, 2002

(65) Prior Publication Data

US 2004/0062130 A1 Apr. 1, 2004

(51) Int. Cl.
*G06F 12/00* (2006.01)

(52) U.S. Cl. ................................ 711/100; 717/171

(58) Field of Classification Search .................... None
See application file for complete search history.

(56) References Cited

U.S. PATENT DOCUMENTS

| | | | |
|---|---|---|---|
| 5,479,654 A | 12/1995 | Squibb | |
| 5,574,906 A | 11/1996 | Morris | |
| 5,634,052 A * | 5/1997 | Morris | 707/1 |
| 5,742,905 A | 4/1998 | Pepe | |
| 5,806,078 A | 9/1998 | Hug | |
| 5,813,017 A | 9/1998 | Morris | |
| 5,832,520 A | 11/1998 | Miller | 707/203 |
| 5,893,119 A * | 4/1999 | Squibb | 707/203 |
| 6,018,747 A * | 1/2000 | Burns et al. | 707/203 |
| 6,052,531 A | 4/2000 | Waldin | |
| 6,076,148 A * | 6/2000 | Kedem | 711/162 |
| 6,088,694 A | 7/2000 | Burns | |
| 6,163,811 A * | 12/2000 | Porter | 709/247 |
| 6,167,258 A | 12/2000 | Schmidt | |
| 6,216,175 B1 * | 4/2001 | Sliger et al. | 717/169 |
| 6,233,589 B1 | 5/2001 | Balcha | |
| 6,269,456 B1 | 7/2001 | Hodges | |
| 6,327,671 B1 | 12/2001 | Menon | |
| 6,349,311 B1 | 2/2002 | Sobel | |
| 6,374,250 B1 | 4/2002 | Ajtai | |
| 6,401,239 B1 | 6/2002 | Miron | |
| 6,442,660 B1 | 8/2002 | Henerlau | |
| 6,470,329 B1 | 10/2002 | Livschitz | |

(Continued)

OTHER PUBLICATIONS

Chakravorty et al. "Architecture and implementation of a remote management framework for dynamically reconfigurable devices", Networks, 2002. ICON 2002. 10th IEEE International Conference on Aug. 27-30, 2002 pp. 375-380.*

(Continued)

*Primary Examiner*—Mano Padmanabhan
*Assistant Examiner*—Paul Baker
(74) *Attorney, Agent, or Firm*—Courtney Staniford & Gregory LLP

(57) ABSTRACT

A system and method for updating electronic files and file components are provided. An upgrade client of a remote device receives a delta file block that codes differences between an original and a new version of a file. The upgrade client stores the delta file block in a first memory area. The upgrade client writes an original file block corresponding to the delta file block from an original memory area to a second memory area. A file updating algorithm generates an updated file block in the host device using the received delta file block and the original file block. This updated file block corresponds to the original file block, and is stored in a third memory area. The upgrade client updates the original file block of the remote device by writing the updated file block over the original file block in the original memory area of the remote device.

1 Claim, 28 Drawing Sheets

U.S. PATENT DOCUMENTS

| | | | |
|---|---|---|---|
| 6,526,574 | B1 | 2/2003 | Jones |
| 6,535,894 | B1 | 3/2003 | Schmidt |
| 6,542,906 | B1 | 4/2003 | Korn |
| 6,594,822 | B1 | 7/2003 | Schweitz |
| 6,615,404 | B1* | 9/2003 | Garfunkel et al. .......... 717/173 |
| 6,629,110 | B1* | 9/2003 | Cane et al. ................. 707/204 |
| 6,651,190 | B1 | 11/2003 | Worley |
| 6,671,703 | B1 | 12/2003 | Thompson |
| 6,671,757 | B1 | 12/2003 | Multer et al. |
| 6,694,336 | B1 | 2/2004 | Multer |
| 6,785,786 | B1* | 8/2004 | Gold et al. ................. 711/162 |
| 6,836,657 | B1 | 12/2004 | Ji |
| 6,892,381 | B1* | 5/2005 | Kim et al. ................. 717/171 |
| 2001/0029178 | A1* | 10/2001 | Criss et al. ................. 455/419 |
| 2001/0049263 | A1* | 12/2001 | Zhang ....................... 455/67.1 |
| 2002/0099726 | A1 | 7/2002 | Crudele |
| 2002/0129107 | A1 | 9/2002 | Loughran |
| 2003/0110253 | A1 | 6/2003 | Anuszczyk |
| 2003/0200207 | A1 | 10/2003 | Dickinson |
| 2003/0212712 | A1 | 11/2003 | Gu |
| 2003/0220944 | A1* | 11/2003 | Schottland et al. ......... 707/203 |
| 2004/0092255 | A1 | 5/2004 | Ji |
| 2004/0098361 | A1 | 5/2004 | Peng |
| 2004/0098413 | A1 | 5/2004 | Peng |
| 2004/0098420 | A1 | 5/2004 | Peng |
| 2004/0098421 | A1 | 5/2004 | Peng |
| 2004/0098427 | A1 | 5/2004 | Peng |
| 2004/0111427 | A1 | 6/2004 | Gu |
| 2004/0220980 | A1 | 11/2004 | Forster |
| 2004/0225996 | A1* | 11/2004 | Venkatesan et al. ........ 717/100 |

OTHER PUBLICATIONS

Lyu, et al. "A procedure-based dynamic software update", Dependable Systems and Networks, 2001. Proeedings. The International Conference on Jul. 1-4, 2001 pp. 271-280.*

Bialek, R.P. "The architecture of a dynamically updatable, component-based system", Computer Software and Applications Conference, 2002. COMPSAC 2002. Proceedings. 26th Annual International Aug. 26-29, 2002 pp. 1012-1016.*

Gumbold, Marc, "Software distribution by reliable multicast", Local Computer Networks, 1996., Proceedings 21st IEEE Conference on Oct. 13-16, 1996 pp. 222-231.*

Hauptmann et al. "On-line maintenance with on-the-fly software replacement" Configurable Distributed Systems, 1996. Proceedings., Third International Conference on May 6-8, 1996 pp. 70-80□□.*

Tichy, Walter F., "The string-to-string correction problem with block moves", ACM Transaction on Computer Systems, vol. 2, No. 4, Nov. 1984, pp. 309-321.

Ajtai, Miklos et al., "Compactly encoding unstructured inputs with differential compression", IBM Almaden Research Center, 44 pages.

Burns, Randal C. et al., "In-place reconstruction of delta compressed files", IBM Almaden Research Center, 9 pages.

Burns, Randal et al., "In-place reconstruction of version differences", IBM Almaden Research Center, 25 pages.

Liv, Jacob et al., "A universal algorithm for sequential data compression", IEEE Transactions on Information Theory, vol. IT-23, No. 3, May 1977.

* cited by examiner

UPDATING ELECTRONIC FILES USING BYTE-LEVEL FILE DIFFERENCING AND UPDATING ALGORITHMS

RELATED APPLICATIONS

This application is related to U.S. Pat. No. 6,925,467, titled BYTE-LEVEL FILE DIFFERENCING AND UPDATING ALGORITHMS, application Ser. No. 10/146,545, filed May 13, 2002.

TECHNICAL FIELD

The disclosed embodiments relate to updating and maintaining electronic files.

BACKGROUND

Software that runs on a Central Processing Unit (CPU) in order to fulfill certain functionality of the host device often changes over time. The changes may result from the need to correct software bugs, adapt to evolving technologies, or add new features to the host device. In particular, embedded software in mobile wireless devices like cellular telephones often includes more bugs than other portable devices or processing systems and generally requires more frequent updates to add new features to the device.

Software includes one or more files which can be in the form of American Standard Code for Information Interchange (ASCII) plain text files or binary code. Software files can be divided into smaller units that are often referred to as components or modules. In the current art, a UNIX platform or Personal Computer (PC) includes multiple software components, and each of the software components is managed and updated independently through a file system supported by a corresponding Operating System (OS). Information used to update software files or software components hosted on UNIX platforms or PCs can be transferred through the Internet or loaded from a secondary storage medium such as a floppy disk, a compact disk read-only memory (CD-ROM), or a compact flash card.

In contrast, in most mobile wireless devices, a real-time OS (RTOS) is typically used in which all software components are linked as a single large file. Further, no file system support is typically provided in these mobile wireless devices. In addition, the single large file needs to be pre-loaded, or embedded, into the device using a slow communication link like a radio, infrared, or serial link.

Obstacles to the update of large files via slow communication links include the time of delivering the updated file to the device. In cases where a difference file is transferred to the device hosting the files targeted for update/revision, this time includes both the communication time to transfer the difference file and the time used by the receiving device to process the difference file and update/revise the targeted files, referred to herein as the host device processing time. While use of a delta file to transfer updated software file or software component information significantly reduces the communication time, as described in the Related Application, reduction of the host device processing time is dictated at least in part by the host device architecture.

The host device can be any of a number of processor-based devices, including cellular telephones and other mobile communication devices, personal digital assistants (PDAs), and personal computers. Using cellular telephones as an example, the typical cellular telephone architecture includes flash read-only memory (ROM), referred to herein as flash ROM or flash memory, and an RTOS. Both the flash memory and the RTOS potentially introduce obstacles to the goal of reducing the host device processing time.

The problem that arises with respect to the flash memory in reducing the host device processing time involves the manner with which writes are performed to flash memory. Flash memory is allocated in units which are often referred to as blocks, sectors, or segments, each of which includes numerous bytes. A write (or rewrite) to the typical flash memory requires erasing and writing (or rewriting) an entire unit, meaning that single bits or bytes can not be written (or rewritten). Therefore the update or revision of a byte stored in flash memory requires erasing and rewriting the entire unit in which the byte is stored. Thus, the time required to update or revise files stored in flash memory is typically greater than that required to update or revise files stored in other types of storage or memory in which single bytes can be written (or rewritten).

The problem that arises with respect to the RTOS in reducing the host device processing time involves the manner in which host device software programs are organized and managed. The RTOS of typical cellular telephones does not support file management and dynamic address resolution for function calls at runtime. Therefore, all embedded software components or programs of the cellular telephone are linked into a single, large host program, and a function within the host program is called from any part of the host program directly through a precompiled start address of the function. Thus, in contrast to a typical computer OS in which file management and dynamic address resolution for function calls are supported, the typical cellular telephone RTOS does not have the capability to manage multiple software components as separate files and support the function calls from one of the software components to another via runtime calling address resolution. Consequently, the host program of a system including an RTOS manages a single, large program and uses static addressing to directly access functions of the program.

This typical device architecture can lead to a problem when updating and revising software components because when the revision or update results in changes in host program size there is a resultant change in the start addresses of the software components that follow the updated/revised software component in the host program. This change in the start address of a software component results in a need to update the corresponding calling addresses in the host program and the instruction/data addresses within the software component. This can be expensive in terms of processing time. Thus, host device processing time associated with embedded software updates/revisions is due in large part to the inefficient rewriting of data to flash memory and the fact that a small change to embedded software at the source code level can result in a large change to the embedded software at the binary code level.

Figure 1:
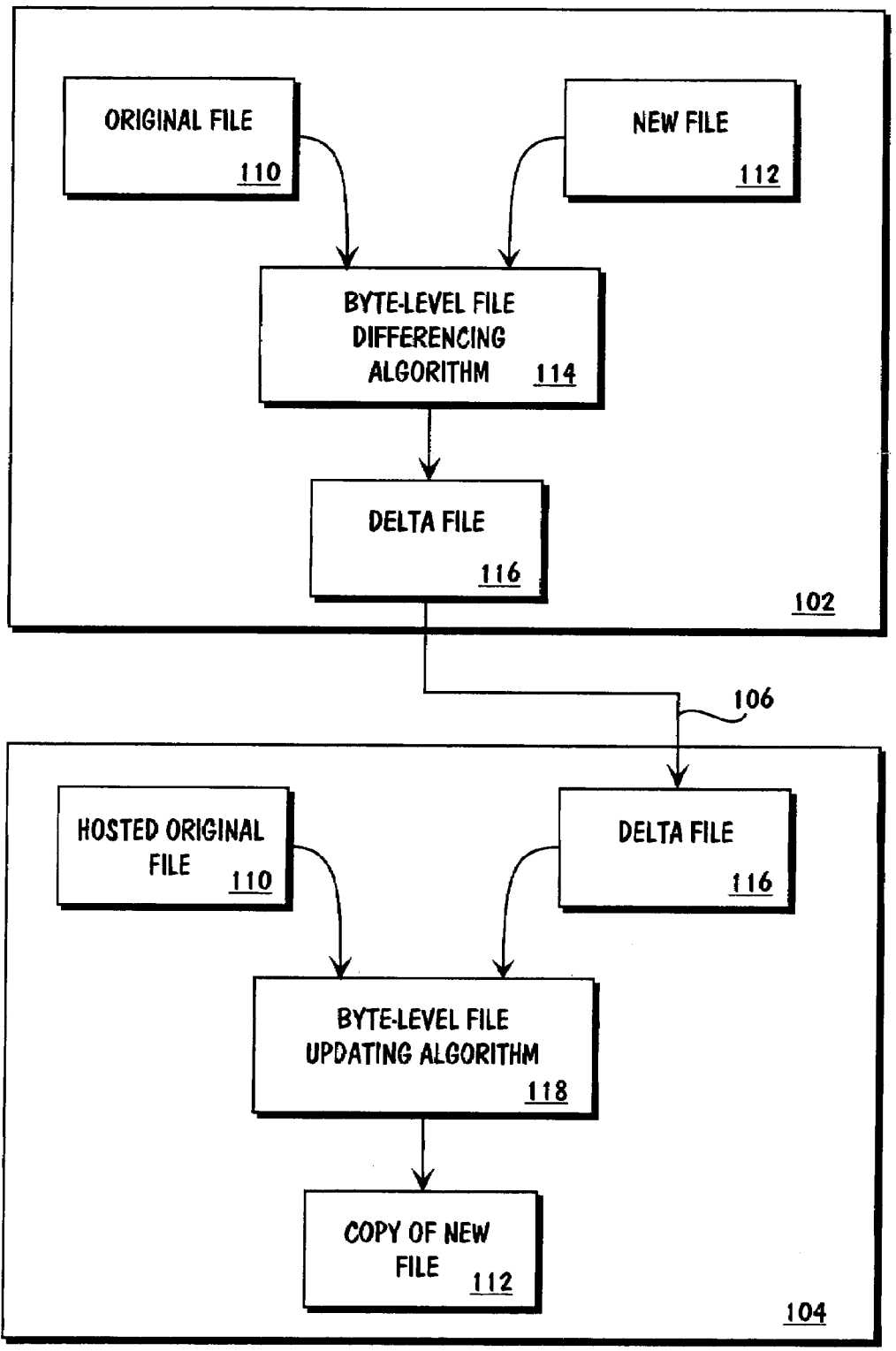
FIG. 1 is a block diagram showing file differencing and updating provided by the byte-level file differencing and updating (FDU) algorithms, under an embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 118 is first introduced and discussed with respect to FIG. 1).

Unless described otherwise below, the construction and operation of the various blocks and structures shown in the Figures are of conventional design. As a result, such blocks need not be described in further detail herein, because they will be understood by those skilled in the relevant art. Such further detail is omitted for brevity and so as not to obscure the detailed description of the invention. Any modifications necessary to the Figures can be readily made by one skilled in the relevant art based on the detailed description provided herein.

DETAILED DESCRIPTION

A system for updating electronic files using a byte-level file differencing and updating (FDU) algorithm, herein referred to as the FDU algorithm, is described in detail herein. FIG. 1 is a block diagram showing file differencing and updating provided by the FDU algorithm of an embodiment. The FDU algorithm includes a differencing component and an updating component. The differencing component, referred to herein as the file differencing algorithm and described in detail in the Related Application, generates a difference file in a first computer system from an original version and a new version of an electronic file. The updating component, referred to herein as the file updating algorithm, generates a copy of the new file on a second computer system using the difference file and the hosted copy of the original file. In the following description, numerous specific details are introduced to provide a thorough understanding of, and enabling description for, embodiments of the invention. One skilled in the relevant art, however, will recognize that the invention can be practiced without one or more of the specific details, or with other components, systems, etc. In other instances, well-known structures or operations are not shown, or are not described in detail, to avoid obscuring aspects of the invention.

With reference to FIG. 1, a first computer system 102 and a second computer system 104 communicate via a communication path 106. These computer systems 102 and 104 include any collection of computing devices operating together, as is known in the art. The computer systems 102 and 104 also include components within a larger computer system. The communication path 106 includes any medium by which files are communicated or transferred between the computer systems 102 and 104. Therefore, this path 106 includes wireless connections, wired connections, and hybrid wireless/wired connections. The communication path 106 also includes couplings or connections to networks including local area networks (LANs), metropolitan area networks (MANs), wide area networks (WANs), proprietary networks, interoffice or backend networks, and the Internet. Furthermore, the communication path 106 includes removable fixed mediums like floppy disks, hard disk drives, and CD-ROM disks, as well as flash RAM, Universal Serial Bus (USB) connections, RS-232 connections, telephone lines, buses, and electronic mail messages.

The first communication system 102 receives an original, or old, version 110 and a new version 112 of an electronic file. The new file 112 is generally an updated or revised version of the original file 110, but is not so limited. The electronic files 110 and 112 include software files including dynamic link library files, shared object files, embedded software components (EBSCs), firmware files, executable files, data files including hex data files, system configuration files, and files including personal use data, but are not so limited. Since any type of file can be regarded as a byte stream, hereafter a file can be described as a byte stream.

The file differencing algorithm 114 receives the new file 112, compares it to the original file 110, and calculates the byte-level differences between the compared files, as described below. The file differencing algorithm 114 may also pre-process the original 110 and the new 112 files to reduce the sizes of the files prior to the calculation of the file differences. The file differencing algorithm 114 generates a difference file 116, referred to herein as a delta file, during the comparison.

Contents of the delta file 116 provide an efficient representation of the byte-level differences between the new and the original files. The delta file 116 includes meta-data along with actual data of replacement and/or insertion operations that represent the differences between the new or current version of the associated file and previous versions of the file, as described below. The file differencing algorithm 114 provides any differences between the original 110 and the new 112 files in the delta file 116 using a minimum number of bytes and a pre-defined format or protocol, thereby providing a delta file optimized in space.

The delta file 116 is transferred or transmitted to another computer system 104 via the communication path 106. Prior to transfer, the delta file 116 may be compressed using compression techniques known in the art, but is not so limited. The file updating algorithm 118 hosted on the receiving computer system 104 uses the delta file 116 along with the hosted original file 110 to generate or create a copy of the new file 112. This copy of the new file 112 is then used to update the original file 110 hosted on the client device 104 that is targeted for revision or updating. Upon completion of this update process, the new file 110 now stored on the second computer system 104 is identical to the new file received in the first computer system.

The differences between an original file and a new file are typically smaller than the new file, leading to significant storage and transmission savings if the differences are transmitted and stored instead of the entire new byte stream. This is particularly important for mobile electronic devices hosting programs that are updated via connections that typically can be slow and expensive, for example wireless or cellular connections. The delta file of an embodiment provides the differences between the new and the original files in a format that is up to 99% smaller than the new file, and this reduced file size provides numerous improvements over typical differencing techniques. One improvement is a reduction in bandwidth required for transmission of the delta file to the client device; the smaller file means less bandwidth is required for the transfer. Also, smaller files require less time for transmission and, therefore, decrease the probability that the file transfer will be interrupted and simultaneously reduce transmission errors in the received file. As for file security, transfer of the delta file instead of the entire new file eliminates piracy of the new file. All of these improvements increase customer satisfaction.

Figure 2:
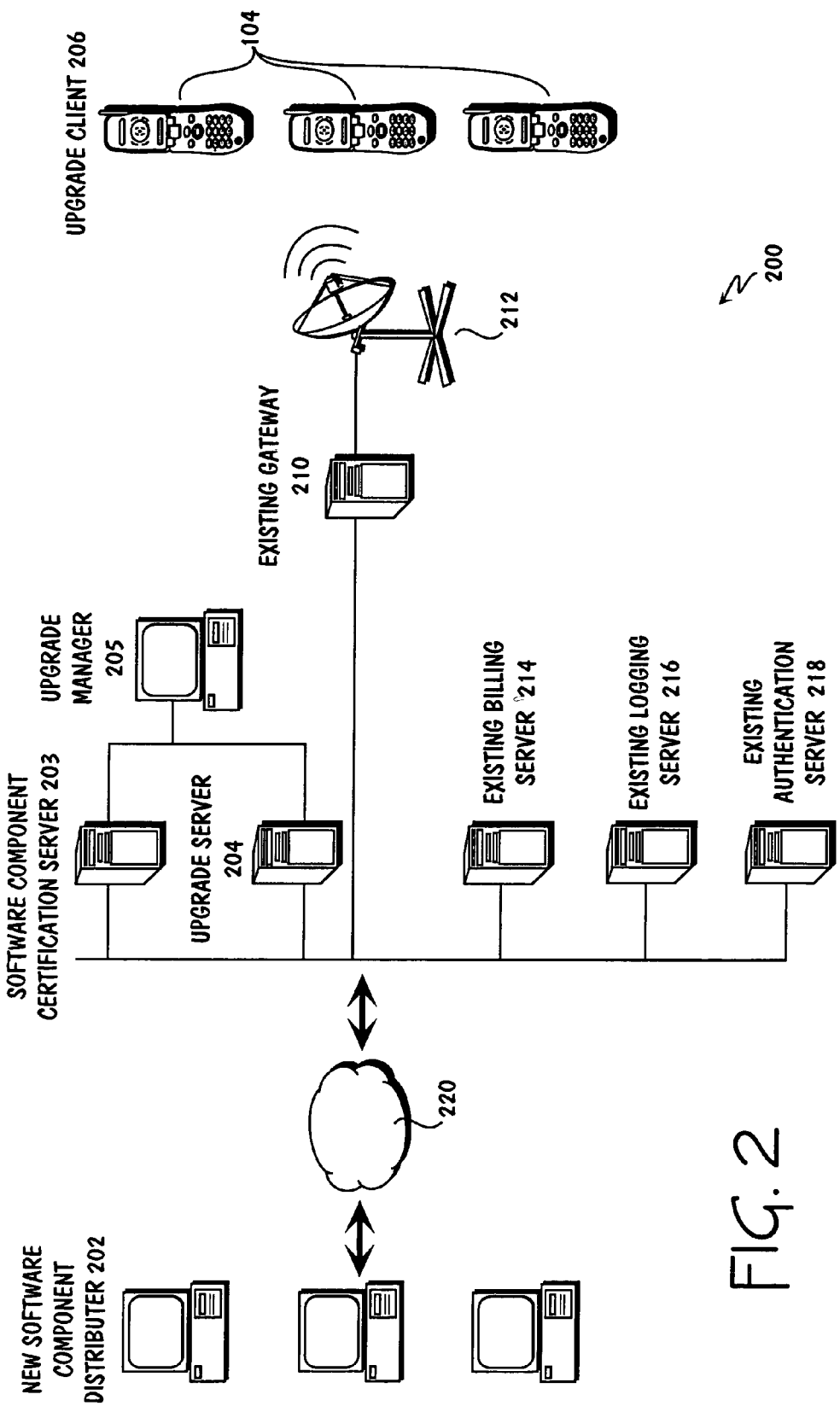
FIG. 2 is a block diagram of an upgrade system including the byte-level FDU algorithms, under an embodiment.

FIG. 2 is a block diagram of a software upgrade system 200, referred to herein as the upgrade system, of an embodiment. The upgrade system uses the delta file and file updating algorithm of an embodiment in supporting software maintenance and application management for client devices including mobile electronic devices, mobile communication devices, cellular telephones, personal digital assistants, computers, and other processor-based devices. This support is provided for all device software ranging from firmware to embedded applications by enabling carriers and device manufacturers to efficiently distribute electronic file content and applications via a wireless infrastructure.

The upgrade system prevents device recalls by supporting the provision of new and revised software files to mobile client devices via various mechanisms of the service provider's wireless infrastructure. These systems function by receiving new and revised software from a software distributor and generating a delta file from the new software using the file differencing algorithm. The delta file is transferred to the client device via the infrastructure of a service provider. The upgrade client, including the file updating algorithm, of the receiving or client device uses the delta file to update the targeted software hosted on the client device.

The upgrade system enables different life cycles between device software and hardware. This upgrade system, therefore, supports up-to-date device functionality in view of the fact that critical software components such as Java™ Connected Limited Device Configuration (CLDC) libraries, Moving Pictures Experts Group-1 (MPEG-1) Layer III (MP3) drivers, communication software, and browser applications evolve faster than the host device hardware and are consequently updated with greater frequency than mobile device manufacturers deliver a new generation of devices. The upgrade system is described in further detail below.

With reference to FIG. 2, the upgrade system 200 maintains embedded software components on client devices 104 via a wireless connection with the device 212, thereby enabling wireless carriers to continuously provide the latest data services to all users. The upgrade system 200 includes, but is not limited to, a new software component distributor or software component distributor 202, service provider upgrade components 203–205, and an upgrade client 206 hosted on the client device 104. The service provider upgrade components include an upgrade server 204 coupled among a software component certification server 203 and an upgrade manager 205.

The software component distributor 202 of an embodiment provides a web-based user interface by which software providers package and release new embedded device software components such as an improved MP3 driver, an upgraded Java™ 2 Platform, Micro Edition (J2ME™) Mobile Information Device Profile (MIDP) library, or a feature-added address book application. Functions of the software component distributor 202 include registering device information and submitting device information to the software component certification server. Also, the software component distributor 202 receives new and original EBSCs and calculates byte-level file differences therefrom using the file differencing algorithm, registers and packages embedded software, and submits embedded software packages to the software component certification server. The new software, following release, is provided to the service provider upgrade components 203–205 via a wired, wireless, or hybrid wired/wireless network coupling or connection 220, but is not so limited.

The software component distributor 202 of an embodiment is hosted on processing systems of the client device manufacturers. In an alternative embodiment, the software component distributor 202 is hosted on processing systems of a software provider. In another alternative embodiment, the software component distributor 202 is hosted on processing systems of the communication service provider, for example the upgrade components 203–205.

The service provider upgrade components 203–205 are coupled among the software component distributor 202, the client devices 104, and the existing components of the service provider's infrastructure 210–218, including the existing gateway 210 and communication infrastructure 212, billing server 214, logging server 216, and authentication server 218. The software component certification server 203 provides an interface to device manufacturers and, thus, receives new device information on embedded software packages from device manufacturers. The software component certification server 203 also receives software component submission requests from the software component distributor, provides notification of approval/decline of new software packages to submitting upgrade servers, provides disk management for submitted and approved software packages, and repackages and distributes approved software packages to upgrade servers. Furthermore, the software component certification server 203 provides carrier-grade security control over potential intrusion and data tampering during the software component submission process.

The upgrade manager 205, functioning as an interface among the software component certification server 203 and the upgrade server 204, provides a web-based user interface by which wireless carrier system administrators verify and approve an embedded device software component upgrade. Also, the upgrade manager 205 configures software and data packaging for optimal device management, schedules remote change notifications, and controls the update policy monitor system. Moreover, the upgrade manager 205 provides integration with the systems of the existing infrastructure, or back end systems (billing, user database authentication, web portal), thereby providing the workflow to determine authentication, access controls, and their integration into the existing billing 214 and logging 216 servers.

The upgrade server 204 provides capabilities including authenticating, connecting, and communicating with mobile devices to perform embedded software component upgrades. Communication with client devices 104 can occur via wireless connections, wired connections, hybrid wired/wireless connections, and other network connections with the client device, as appropriate to the corresponding service provider. In addition, the upgrade server 204 supports existing billing, data collection, and logging services of the service provider.

As an example of communications among the upgrade server 204 and client devices 104, when a delta file is available for transfer to a client device 104 from the upgrade server 204, the server 204 sends a user notification to notify the client device user that there are software components available for updating. The user notification can take the form of a text message via a Short Message Service (SMS) push protocol, Hypertext Transfer Protocol (HTTP), or Wireless Application Protocol (WAP), but is not so limited. Upon receiving confirmation from the handset users, the upgrade server 204 uses the original handset data communication protocol to send the delta file to the requesting handset.

In response to receipt of the confirmation from the handset, the upgrade server 204 authenticates and authorizes the user and/or requesting device, and verifies prerequisite capabilities and limitations of the requesting device. Following authentication the upgrade server 204, as the manager of client device configuration data, identifies the current versions of embedded software components of the requesting device 104, identifies and transfers appropriate delta files to the requesting device 104, logs the status of the upgrade transaction, and reports the results to the upgrade manager 205. An embodiment of the upgrade server 204 includes automatic failure recovery mechanisms. In addition, the upgrade server 204 activates/deactivates the software upgrade service over the air, and notifies remote users of software changes.

With reference to FIG. 1, the upgrade client 206 is embedded in the client devices 104, but is not so limited. The upgrade client 206 stores and maintains configuration data of the host device 104, and provides for the maintenance and upgrading of embedded device software components using the file updating algorithm 118. The upgrade client 206 supports a simple user interface and is incorporated into mobile device software. Upon execution, the upgrade client 206 automatically detects the remote change of any embedded software components, notifies users of an embedded software component upgrade, and upgrades a software component based on the carriers and/or users control, as appropriate for a particular service provider. The upgrade client 206 also includes an automatic failure recovery mechanism.

The client device determines the status of numerous device parameters prior to participating in an update procedure. This is done in order to pre-qualify the device for the update procedure, or verify that the condition of the client device is such that the update procedure can be completed once begun. The client device pre-qualification includes determining if the client device is in a cradle or charging mode, if the client device is connected to a serial cable, if the state of battery charge is sufficient to perform the updating process, if the Received Signal Strength Indication (RSSI) or signal strength is sufficient for the data transfer, and if the targeted EBSC is currently in use.

The upgrade system 200 of an embodiment supports numerous types of software file or component updates via delta file. The file types for which updates are supported include executable files, byte stream files, and data files, but are not so limited. The executable files, or image files, include software files used in the client device to execute tasks, for example the operating system (OS), hardware device drivers, and K Virtual Machine (KVM) files. The byte stream files include files used by other executable files, for example, icon files, logo files, and MP3 files. Data files include files containing personal use data, and handset reference data, for example the calibration configuration files, the Protocol Independent Multicast (PIM) files, and system configuration files.

The upgrade client of an embodiment uses numerous methods to update EBSCs depending on the file type to be updated and the resources allocated by the client device manufacturer to support these updates. These update methods include, but are not limited to, the following: updating the OS, communication protocol and other critical software components using reserved ROM; updating the OS, communication protocol and other critical components using reserved RAM; updating the communication protocol in the absence of reserved ROM or RAM; and single-line updates of non-critical EBSCs. These update methods are described fully below.

The update methods of an embodiment include non-critical component updates and critical component updates. These categories are based on the usage of the software components targeted for update, and are described further below.

Non-critical components include embedded software components (EBSCs) that are easily recovered over the air following a failure during the update process. Examples of non-critical components include browsers and KVM files, but are not so limited.

Figure 3:
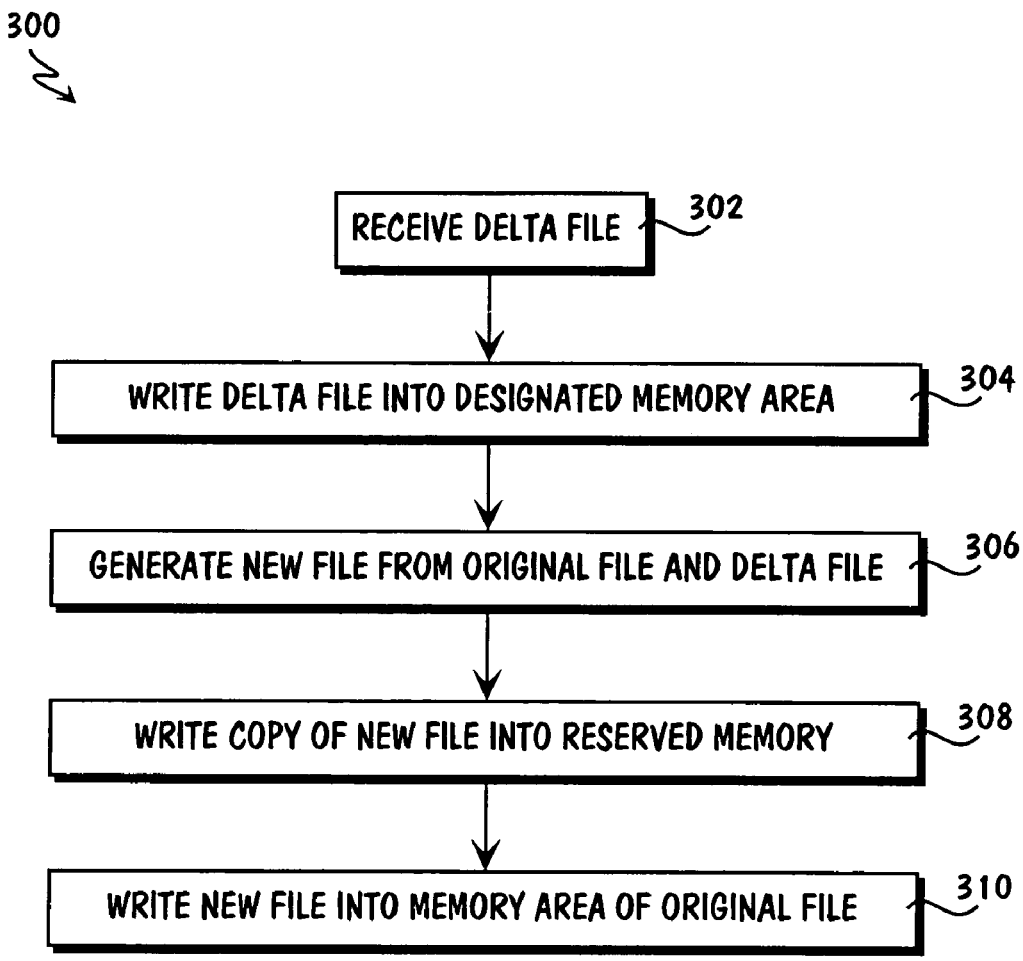
FIG. 3 is a flow diagram of a non-critical software component update, under the embodiment of FIG. 1.

FIG. 3 is a flow diagram 300 of a non-critical component update, under an embodiment. The client device receives the delta file from the upgrade server via a network connection 302, as described above. The delta file, upon receipt in the client device, is written into memory, for example RAM or ROM storage 304, as described below. The file updating algorithm of the client device then generates a copy of the new file or EBSC from the original file or EBSC using the delta file 306. The copy of the new file is written into memory 308, for example RAM, reserved RAM, ROM, and reserved ROM. The copy of the new file is subsequently written from reserved memory into the memory locations that contain the original file or EBSC 310.

Critical components include software components used in the update procedure or the EBSCs critical to device operation. Further, critical components include EBSCs that are not easily recovered over the air following a failure during the update process. Examples of critical components include the operating system files, protocol stacks, the upgrade client files, communication libraries, and display or LCD driver files, but are not so limited. The update procedure differs slightly between these two categories.

Figure 4:
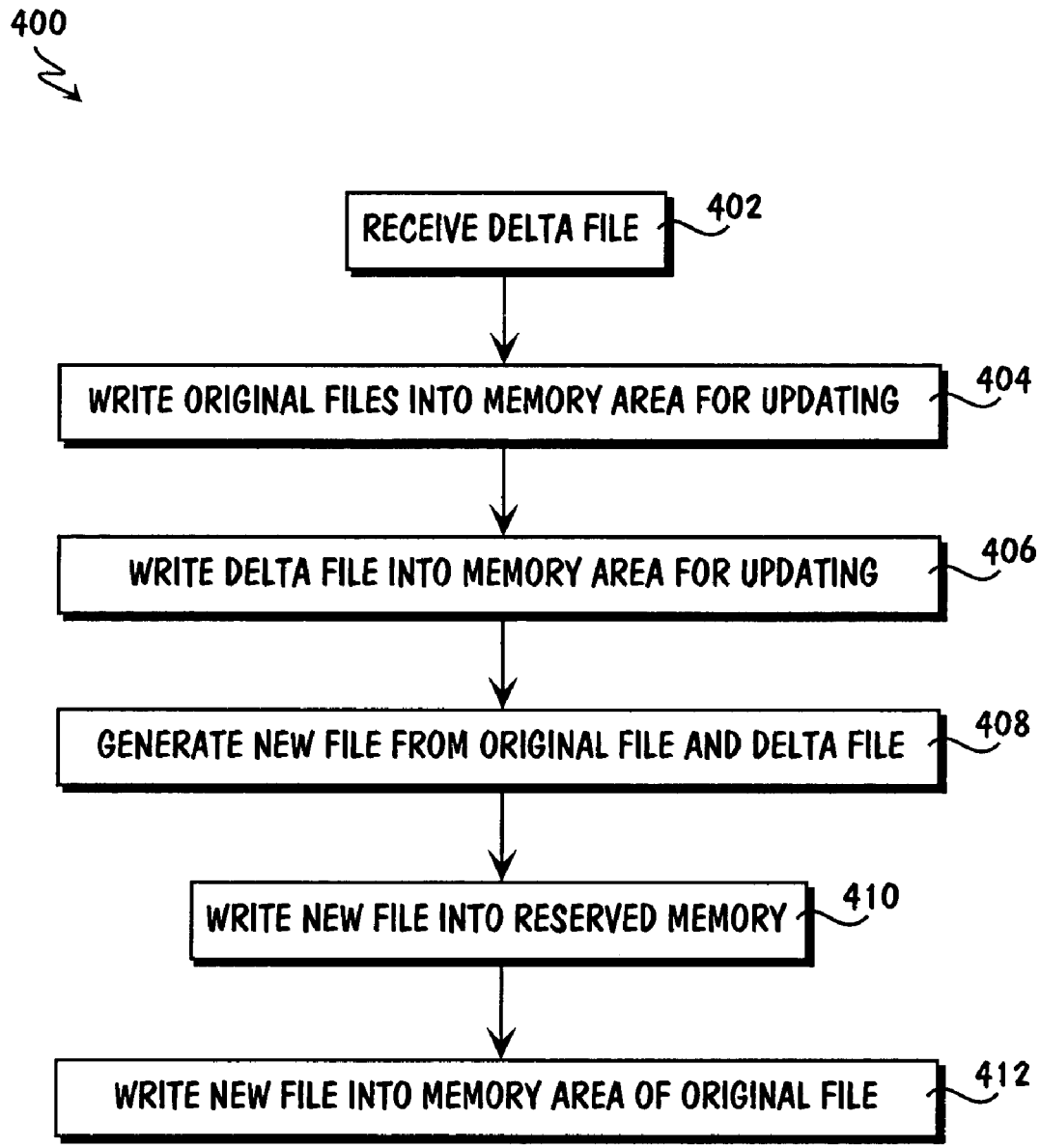
FIG. 4 is a flow diagram of a critical component update, under the embodiment of FIG. 1.

FIG. 4 is a flow diagram 400 of a critical component update, under an embodiment. The client device receives the delta file from the upgrade server via a network connection 402. As described above, the delta file can include file or EBSC upgrades of executable, byte stream, and data files. The wireless network of an embodiment is that of the mobile service provider, but is not so limited.

Upon receipt of the delta file, generally, the original files or EBSCs targeted for updating are copied from the flash memory of the client device into working memory 404, for example RAM or ROM storage, as appropriate. The client device allocates the RAM or ROM for use in storing the updating software components. The delta file is also written into the memory 406, as appropriate.

The upgrade client of the client device then uses the file updating algorithm along with the delta file to generate a copy of the new file from the original file 408. The copy of the new file is written into reserved memory 410, as appropriate. If necessary, this process can be repeated until all dependency files are also loaded into the memory.

Following generation, the copy of the new file is written from reserved memory into the original memory locations containing the original file or EBSC 412. When the size of the new file is the same as or smaller than that of the original file, the new file is written into the memory locations of the original file, thereby replacing the original file. When the size of the new file is larger that that of the original file, dynamic addressing is used to redirect the routine address dynamically, as further described below.

In the course of writing new files over original files, when the original files are critical software components or files, the client device of an embodiment uses two procedures to prevent the writing of new files over original files at times when the original file is in use. As described above, critical components include the operating system files, protocol stack files, the upgrade client files, and display or LCD driver files.

One procedure is a delay procedure for use when the new file is an update or revision of the protocol stack. As such, writing or re-mapping of the new file is delayed until after the client device disconnects from its associated network. Following writing of the new file, the client device will reset and then re-register with the associated network.

Figure 5:
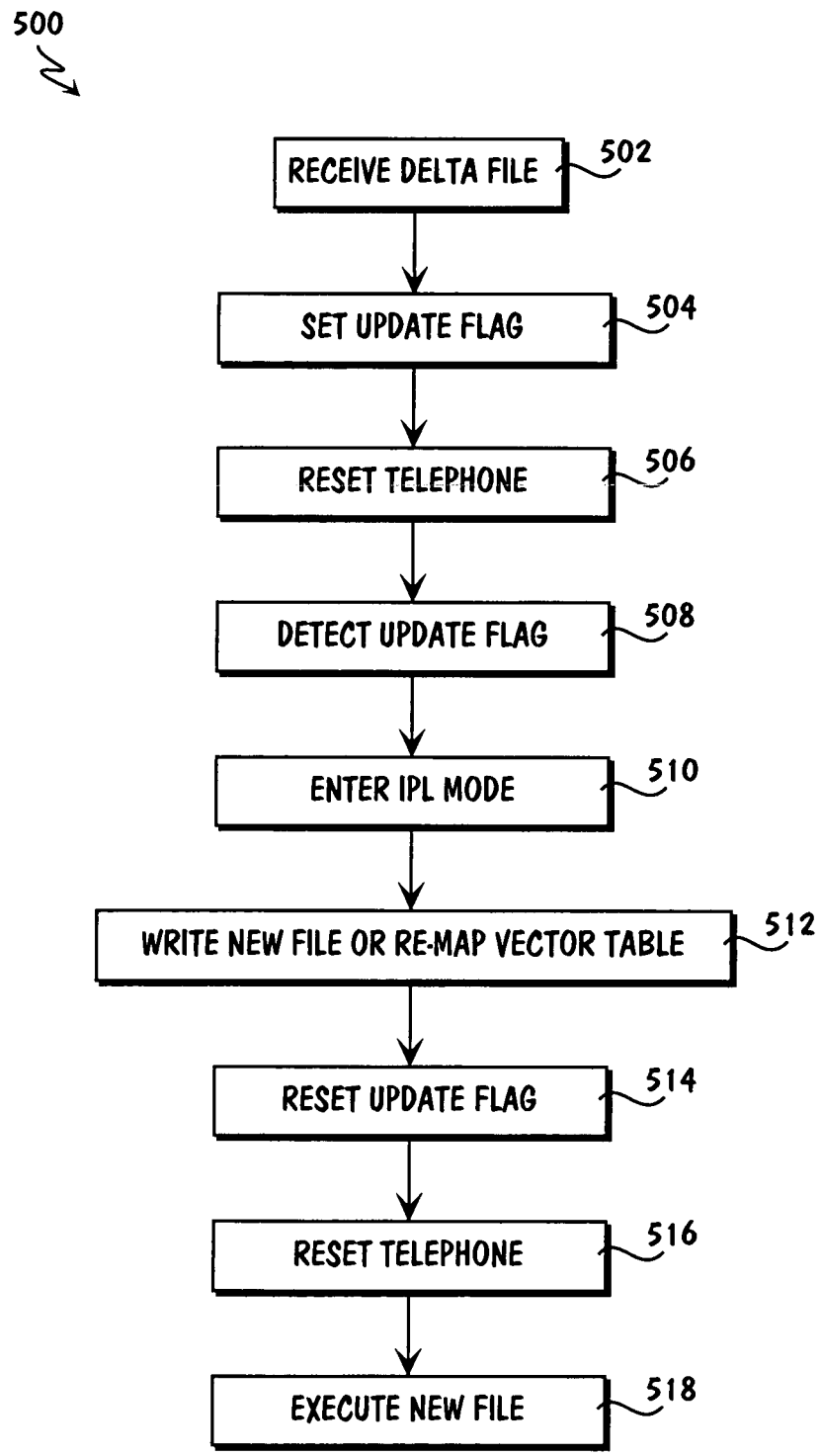
FIG. 5 is a flow diagram of critical software component write protection, under an embodiment.

The client device uses another procedure when the new file is a critical software component other than the protocol stack. FIG. 5 is a flow diagram 500 of critical software component write protection, under an embodiment. When the client device is a cellular telephone, the software of the cellular telephone sets an update flag 504 in the common area between the telephone mode and the Initial Program Load (IPL) mode upon receipt of a delta file 502; the client device is then reset 506. The telephone mode is one operating mode of a cellular telephone in which the telephone runs under a multitasking RTOS and allows users to place and receive calls, and transfer data packets from/to a wireless network. The IPL mode is another operating mode in which the telephone runs under a single tasking operating system and can download and rewrite embedded software through couplings or connections including cables, infrared (IR) links, or Bluetooth links.

Following resetting of the client device, during the subsequent booting sequence, device software detects the set update flag 508 and places the client device in the IPL mode 510. In the IPL mode, the client device either writes the new file into the memory locations of the original file, or re-maps the vector table 512. The update flag is then reset 514. Finally, device software resets the telephone 516, which boots into the telephone mode and executes the new file 518.

The update response of an embodiment includes two types of files: modified files, and full files. The modified file includes the delta file. The full file includes files containing the complete ROM image.

Figure 6:
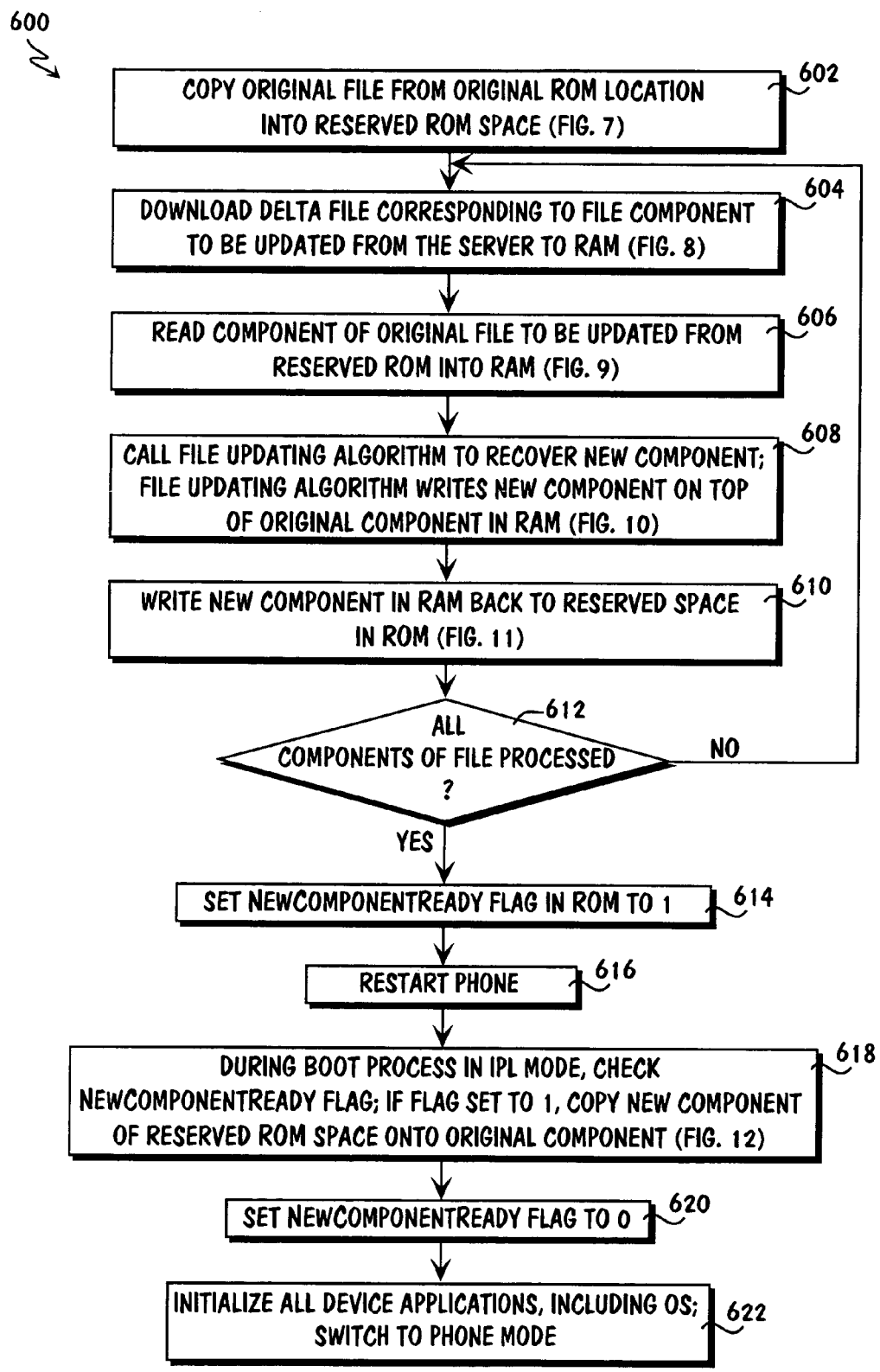
FIG. 6 is a flow diagram of a method for updating the operating system (OS), communication protocol, and other critical embedded software components (EBSCs) using reserved ROM, under an embodiment.

FIG. 6 is a flow diagram 600 of a method for updating the OS, communication protocol, and other critical EBSCs using reserved ROM, under an embodiment. FIGS. 7–12 are block diagram depictions of particular operations of the flow diagram 600. The most robust methods of software component update use ROM reserved by the device manufacturer, but the embodiment is not so limited. This method can also be used to update the upgrade client files of the client device.

With reference to FIG. 6, the upgrade client begins by copying the original EBSC or file targeted for update from its original location in device ROM into a target EBSC file at a location in the reserved ROM, 602. The upgrade client then downloads the delta file corresponding to one block of the target EBSC to be updated from the upgrade server into the client device RAM, 604. The block of the target EBSC to be updated is then copied from the reserved ROM into the RAM, 606. The file updating algorithm of the upgrade client generates or recovers a copy of the new or recovered EBSC block from the original EBSC block using the delta file, 608; the recovered EBSC block is written over the original EBSC block in RAM. Following writing of the new EBSC block to RAM, the new EBSC block is written back as a block from RAM to the appropriate memory locations in the reserved ROM block, 610.

Operation now checks to determine whether all blocks of the delta file have been downloaded and processed, 612. If delta file blocks remain to be processed, operation returns to download the delta file corresponding to the next block of the target EBSC from the upgrade server, 604, and continues.

Following processing of all blocks of the delta file, the NewComponentReady flag in the ROM is set to 1, 614. The upgrade client then restarts the telephone, 616.

During the restart boot process, in the IPL mode, the NewComponentReady flag is checked, 618. If this flag is set to 1, the upgrade client writes the new EBSC file from the reserved ROM location over the corresponding original EBSC block in the original ROM location. Following or simultaneous with this copy operation, the NewComponentReady flag is set to 0, 620. The boot process then continues to initialize all other device applications, including the OS, and subsequently switches to the telephone mode, 622.

Figure 7:
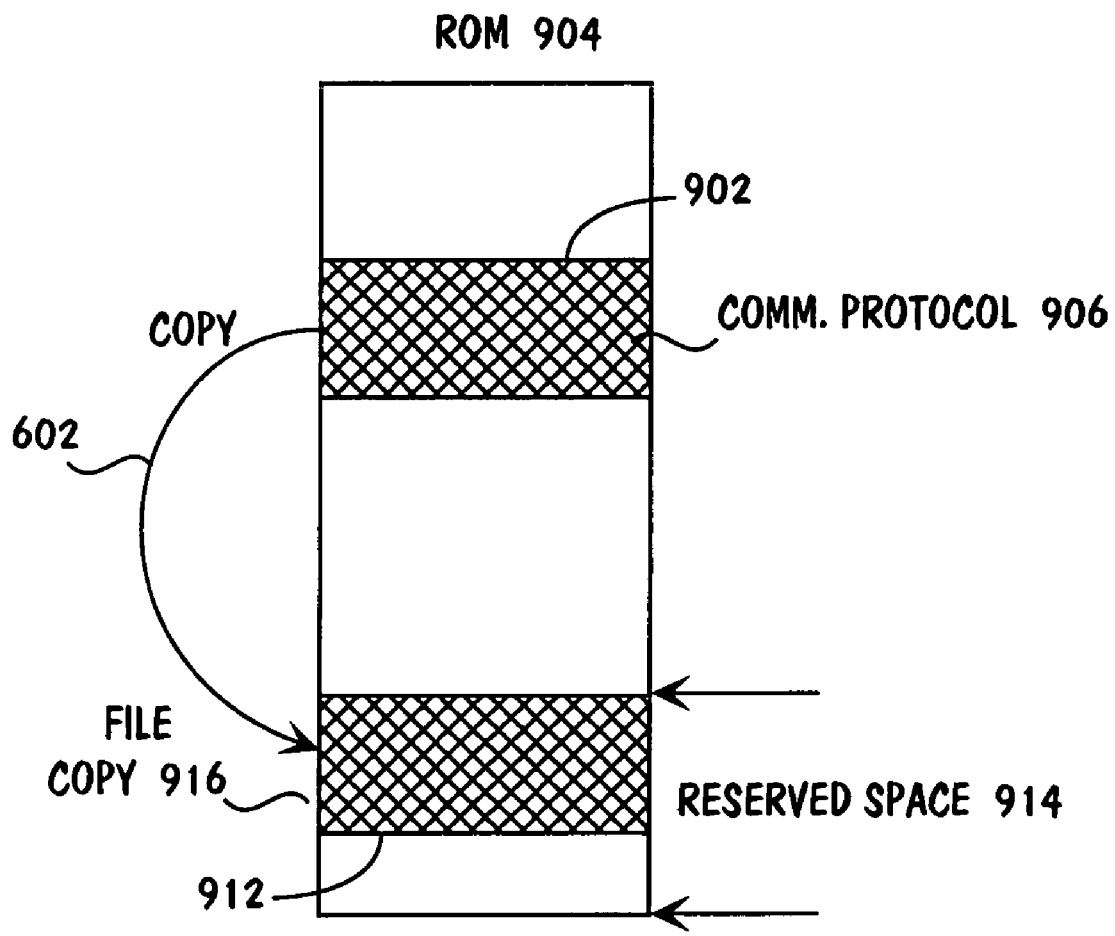
FIGS. 7–12 are block diagram depictions of particular operations of the flow diagram of FIG. 6.
Figure 8:
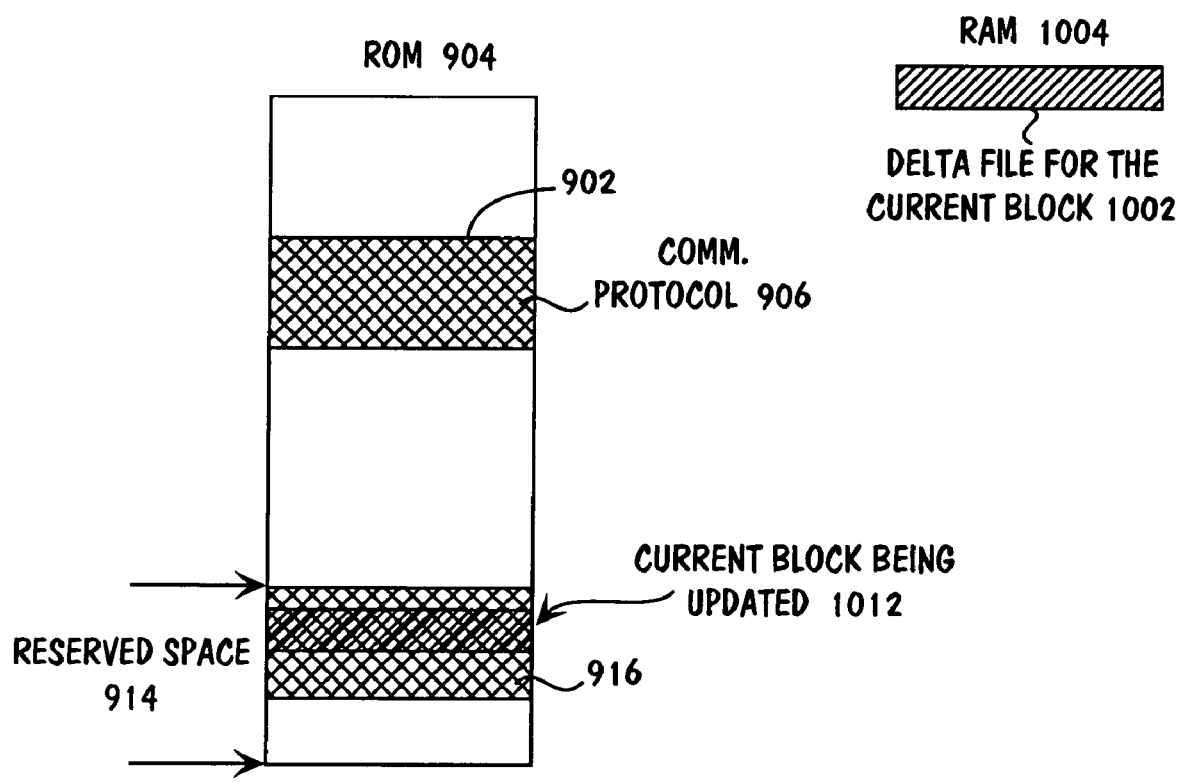
Figure 9:
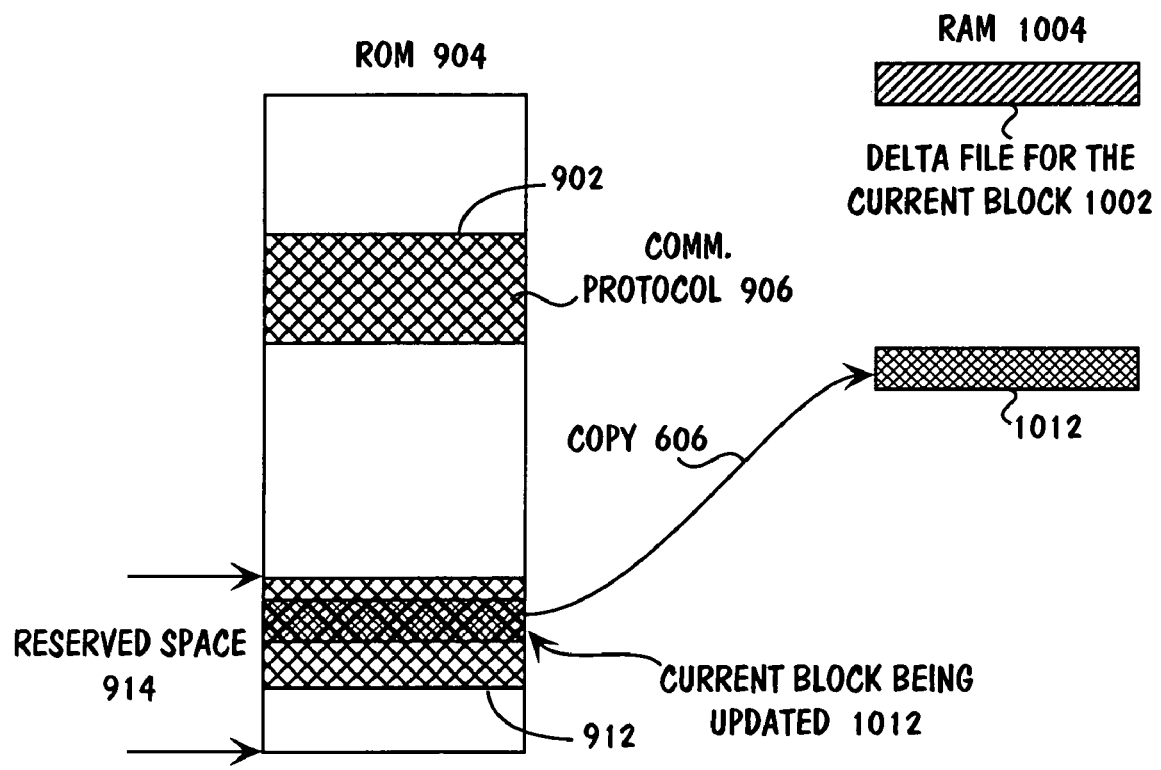
Figure 10:
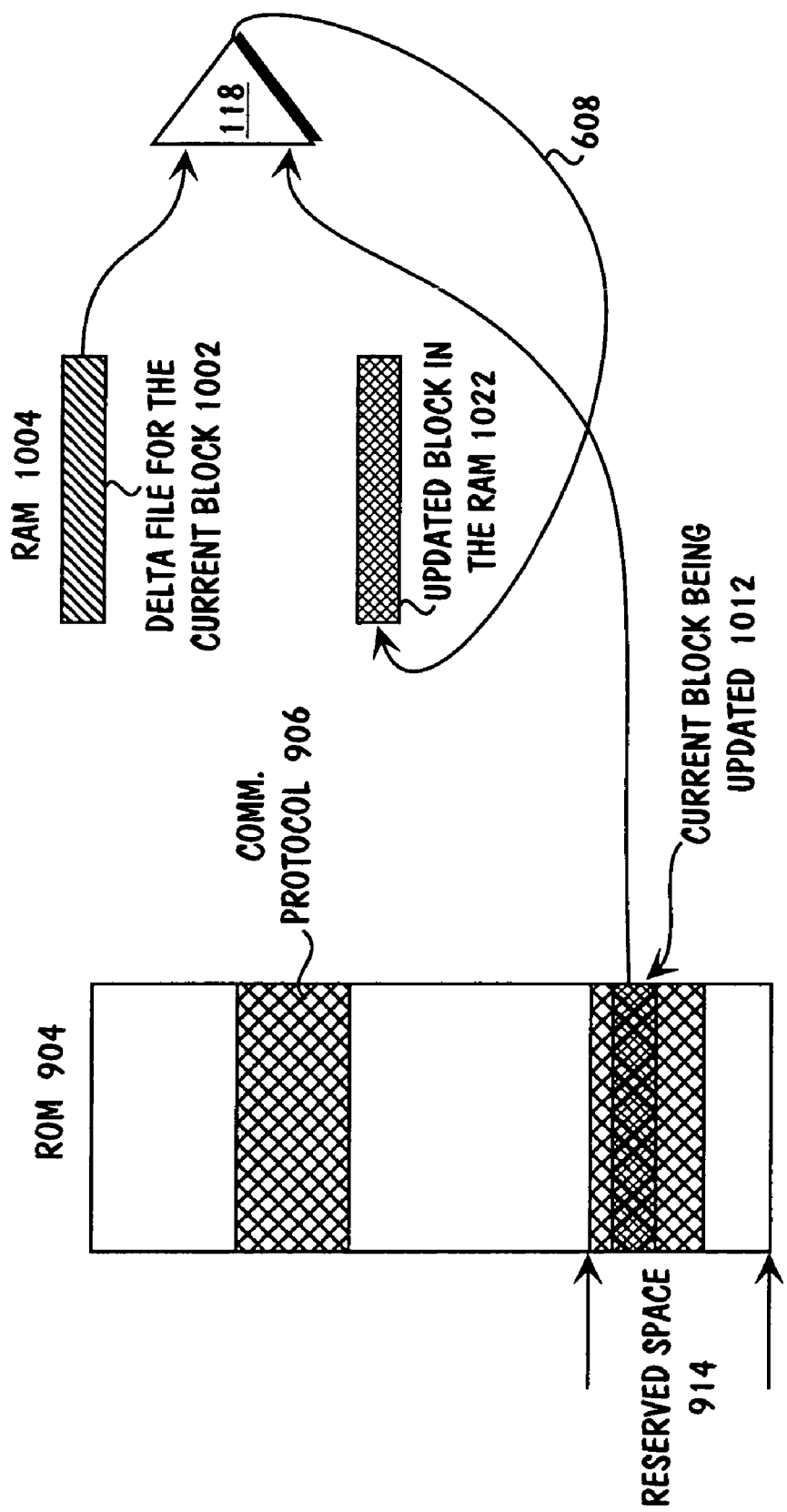
Figure 11:
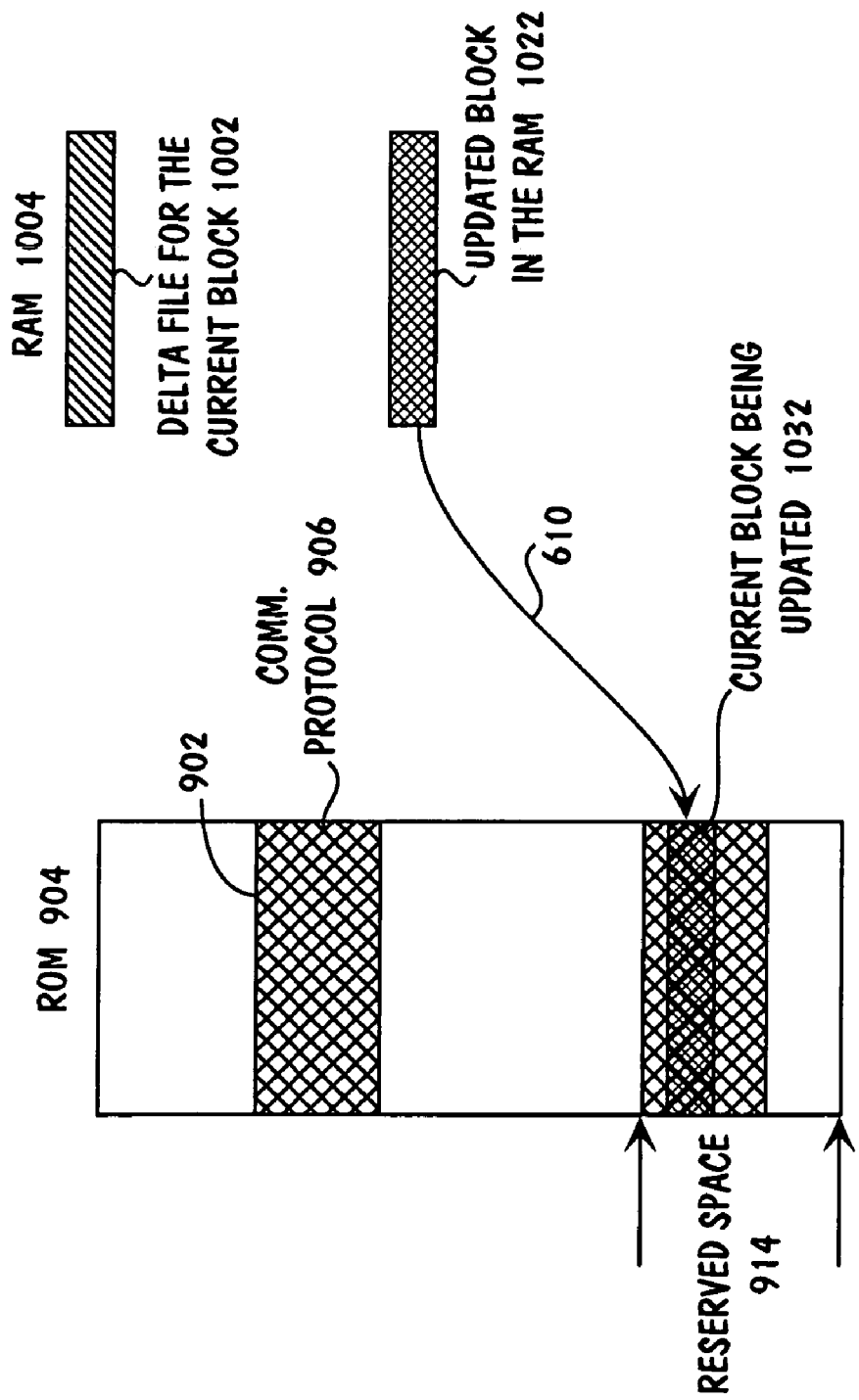

FIGS. 7–12, along with reference to FIG. 6, provide example depictions for updating the communication protocol using reserved ROM, but the embodiment is not so limited. The upgrade client begins by copying 602 the original EBSC 906 or file targeted for update from its original location 902 in ROM 904 into a target EBSC file 916 at location 912 in the reserved ROM 914 (FIG. 7). The upgrade client then downloads 604 the delta file 1002 corresponding to one block 1012 of the target EBSC 916 from the upgrade server into the client device RAM 1004 (FIG. 8). The block 1012 of the target EBSC 916 is then copied 606 from the reserved ROM 914 into the RAM 1004 (FIG. 9). The file updating algorithm 118 of the upgrade client generates or recovers 608 a copy of the new EBSC block 1022 from the original EBSC block 1012 in reserved ROM 914 using the delta file block 1002 in RAM 1004 (FIG. 10); the recovered or new EBSC block 1022 is written over the original EBSC block 1012 in RAM. Following writing of the new EBSC block 1022 to RAM 1004, the new EBSC block 1022 is written back 610 as a block 1032 to the appropriate memory locations in the reserved ROM block 914 (FIG. 11).

Operation now checks to determine whether all blocks of the delta file have been downloaded and processed. If blocks remain to be processed, operation returns to download the delta file corresponding to the next block of the target EBSC from the upgrade server, and continues.

Figure 12:
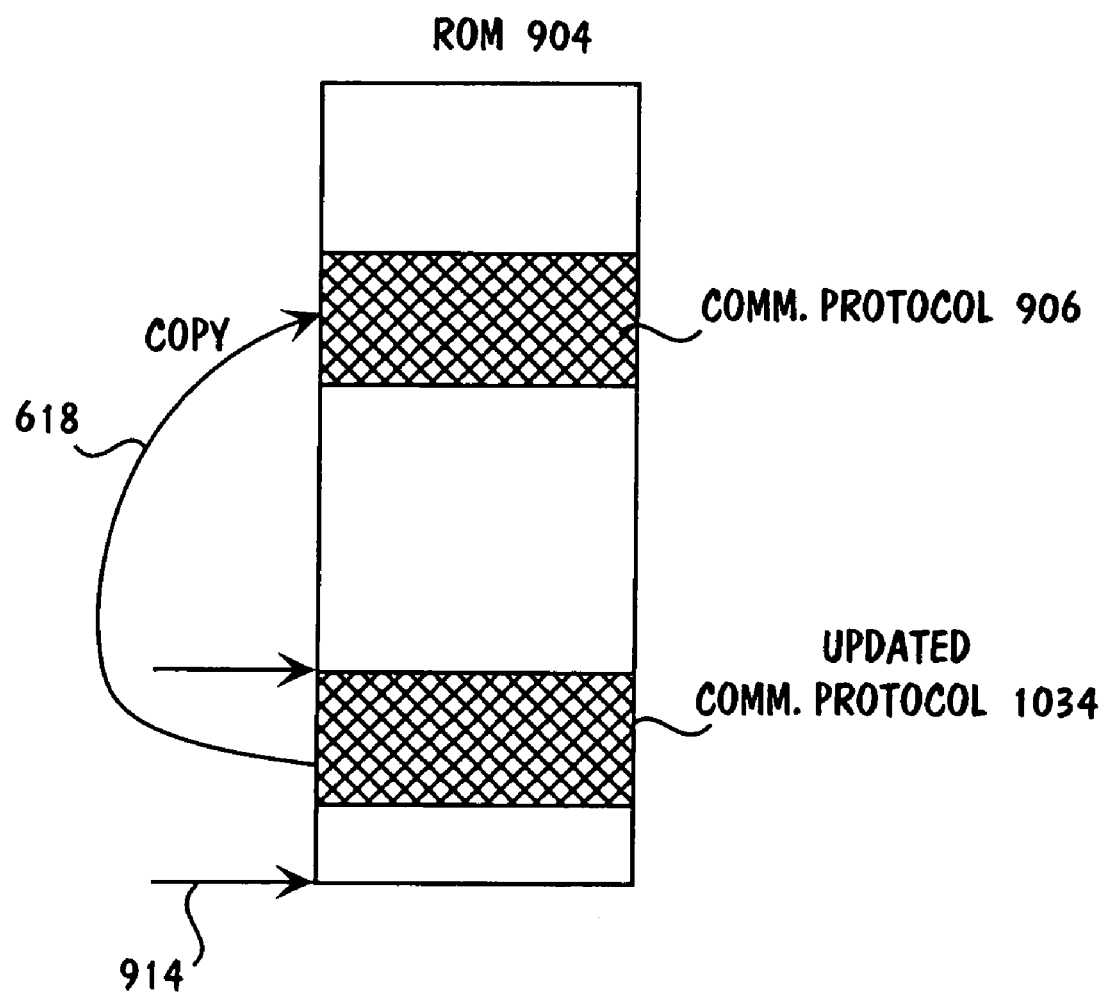

Following processing of all blocks of the delta file, the NewComponentReady flag in the ROM is set to 1, and the upgrade client restarts the telephone. During the restart boot process, in the IPL mode, the NewComponentReady flag is checked. If this flag is set to 1, the upgrade client writes 618 the new EBSC file 1034 from the reserved ROM location 914 over the corresponding original EBSC block 906 in the original ROM location 902 (FIG. 12). Following or simultaneous with this copy operation, the NewComponentReady flag is set to 0. The boot process then continues to initialize all other device applications, including the OS, and subsequently switches to the telephone mode.

Note that this update process has minimal impact on the user because the involved components are not required to cease operation during the update. Regarding failure of the upgrade process during the update, failures during downloading and processing of delta file blocks have no affect on device operations, including operation of the particular EBSC targeted for update. In an embodiment, the device presents the user with a failure message, and the user may re-command the upgrade client to perform the update at another time.

In the event of a failure while the upgrade client is writing the new EBSC block over the original EBSC block in the original ROM location, the original EBSC block is recovered using a backup copy of the original EBSC block. The recovery includes reading the backup copy of the original EBSC block from a location in the host device memory, and writing the backup copy to the original ROM location. Following a failure during the write process the host device may automatically re-initiate the failed update at a future time or, alternatively, the host device may present a failure message to the user and enable the user to re-command the upgrade client to perform the update at a future time.

Figure 13:
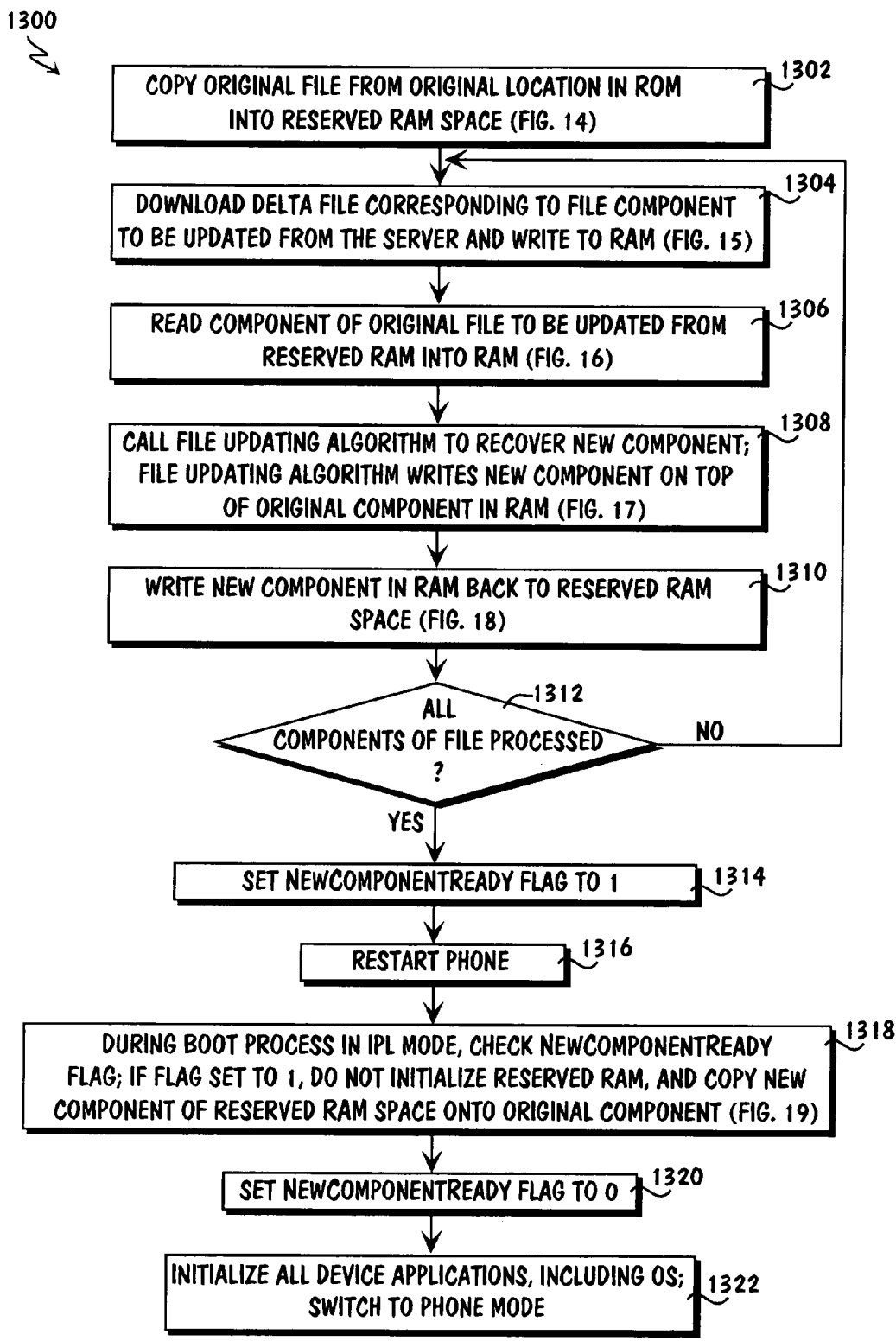
FIG. 13 is a flow diagram of a method for updating the OS, communication protocol, and other critical EBSCs using reserved random access memory (RAM), under an embodiment.

FIG. 13 is a flow diagram 1300 of a method for updating the OS, communication protocol, and other critical EBSCs using reserved RAM, under an embodiment. FIGS. 14–19 are block diagram depictions of particular operations of the flow diagram 1300. This method provides a safe way of updating critical EBSCs in the absence of reserved ROM. The size of the reserved RAM should be large enough to contain any hosted EBSCs that are updated or revised using this method.

With reference to FIG. 13 the upgrade client begins by copying the original EBSC or file targeted for update from its original location in device ROM into a location reserved in RAM, 1302. The upgrade client then downloads the delta file corresponding to one block of the target EBSC from the upgrade server into the client device RAM, 1304. The block of the target EBSC to be updated is then read from the reserved RAM and copied as a block into the RAM, 1306. The file updating algorithm of the upgrade client generates or recovers a copy of the new EBSC block from the original EBSC block in reserved RAM using the delta file block in device RAM, 1308. The recovered EBSC block is written over the original EBSC block in RAM. Following writing of the new EBSC block to RAM, the new EBSC block is written back to the appropriate memory locations in the reserved RAM, 1310.

Operation now checks to determine whether all blocks of the delta file have been downloaded and processed, 1312. If blocks remain to be processed, operation returns to download the delta file corresponding to the next block of the target EBSC from the upgrade server, 1304, and continues.

Following processing of all blocks of the delta file, the NewComponentReady flag in the ROM is set to 1, 1314. The upgrade client then restarts the telephone, 1316.

During the restart boot process, in the IPL mode, the NewComponentReady flag is checked, 1318. If this flag is set to 1, then the boot code will not initialize the reserved RAM location. Also, the upgrade client writes or copies the new EBSC from the reserved RAM location over the corresponding original EBSC in the original ROM location. Following or simultaneous with this copy operation, the NewComponentReady flag is set to 0, 1320. The boot process then continues to initialize all other device applications, including the OS, and subsequently switches the client device to the telephone mode, 1322.

Figure 14:
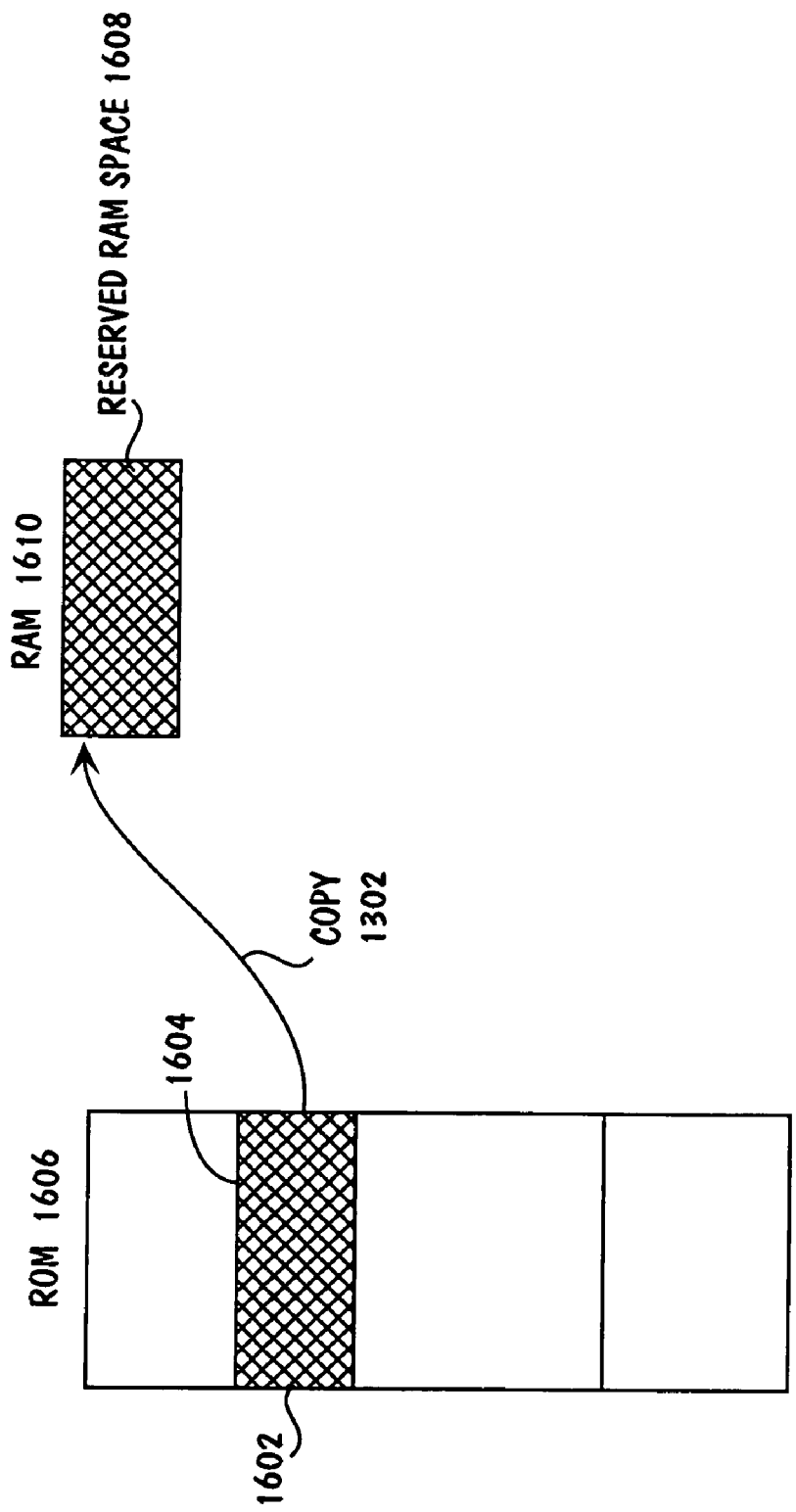
FIGS. 14–19 are block diagram depictions of particular operations of the flow diagram of FIG. 13.
Figure 15:
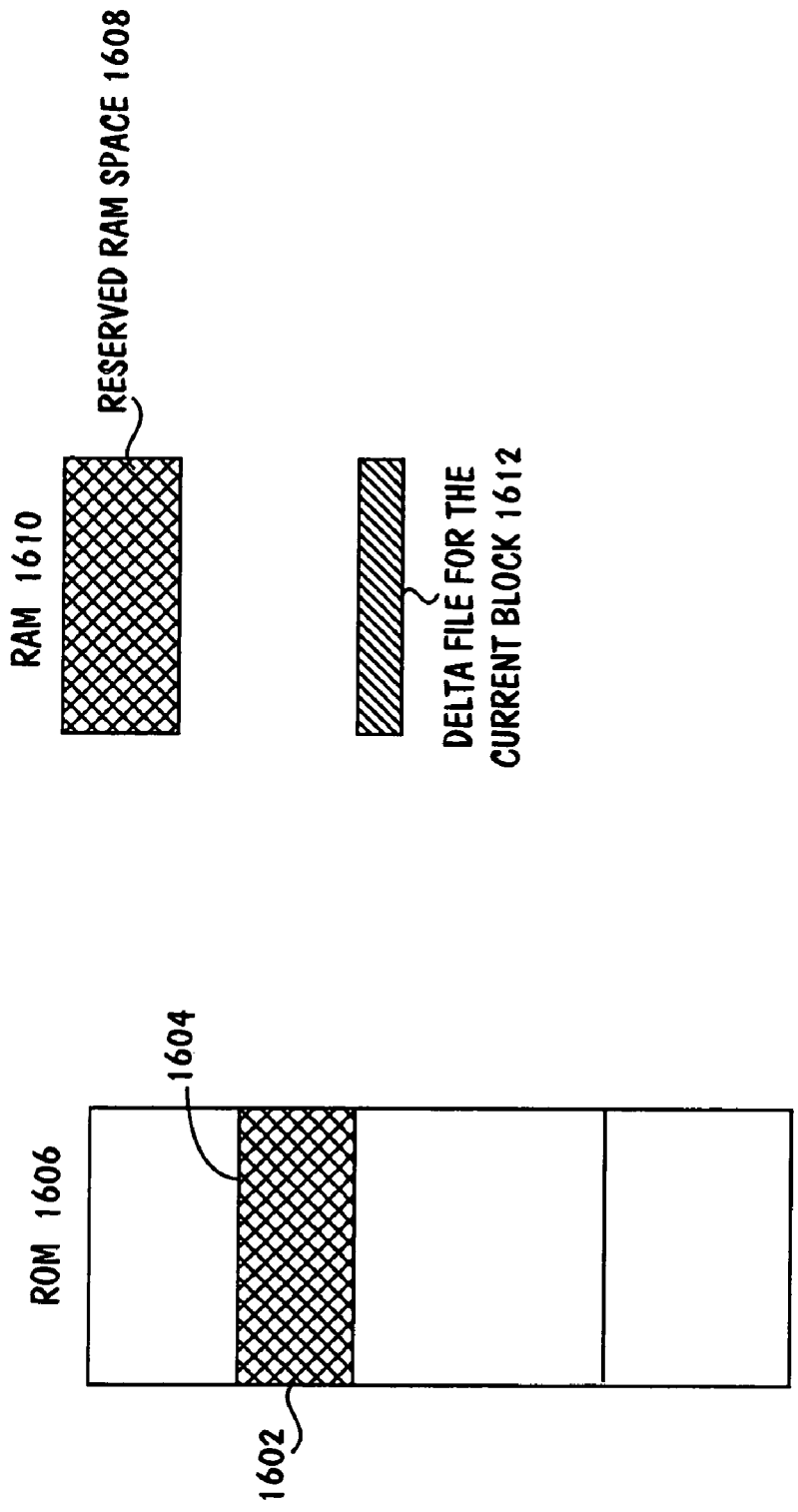
Figure 16:
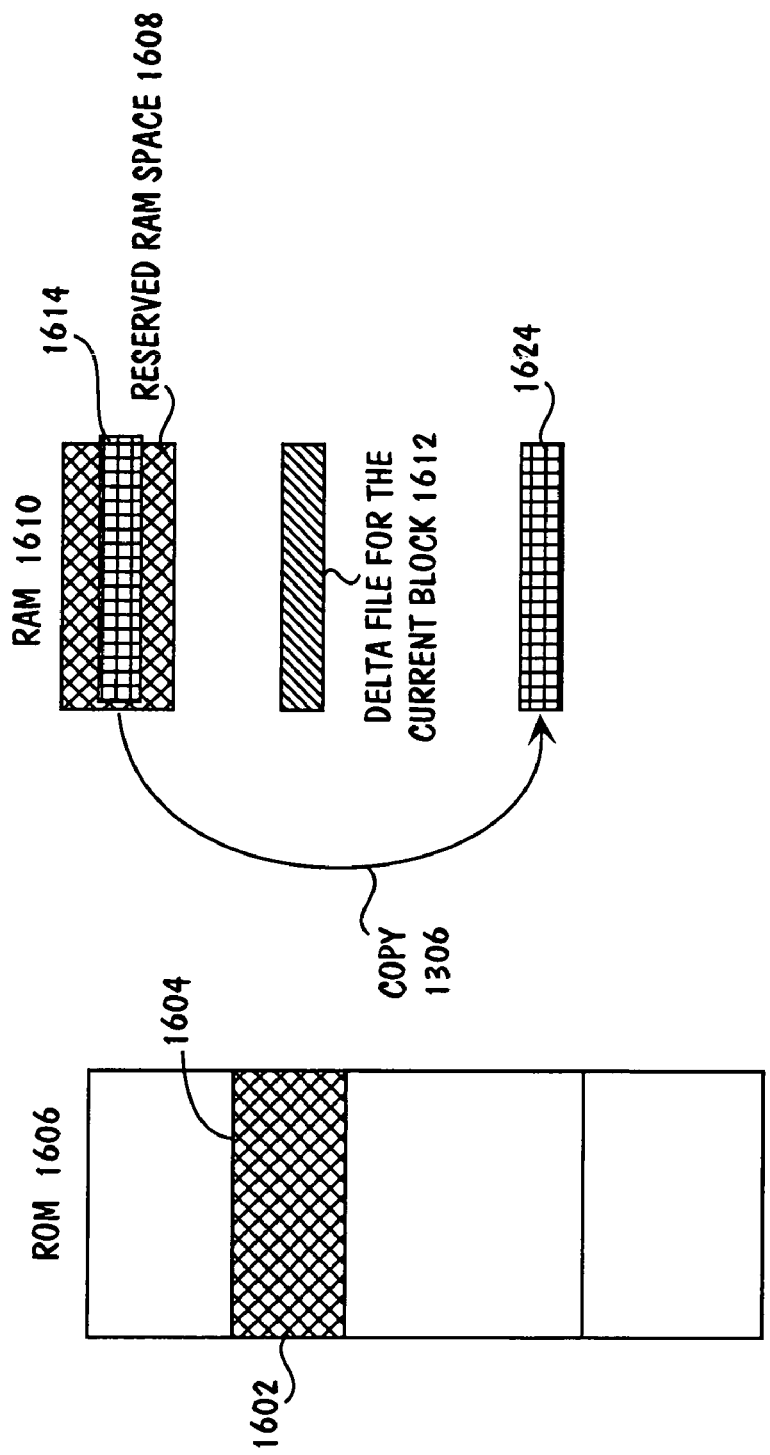
Figure 17:
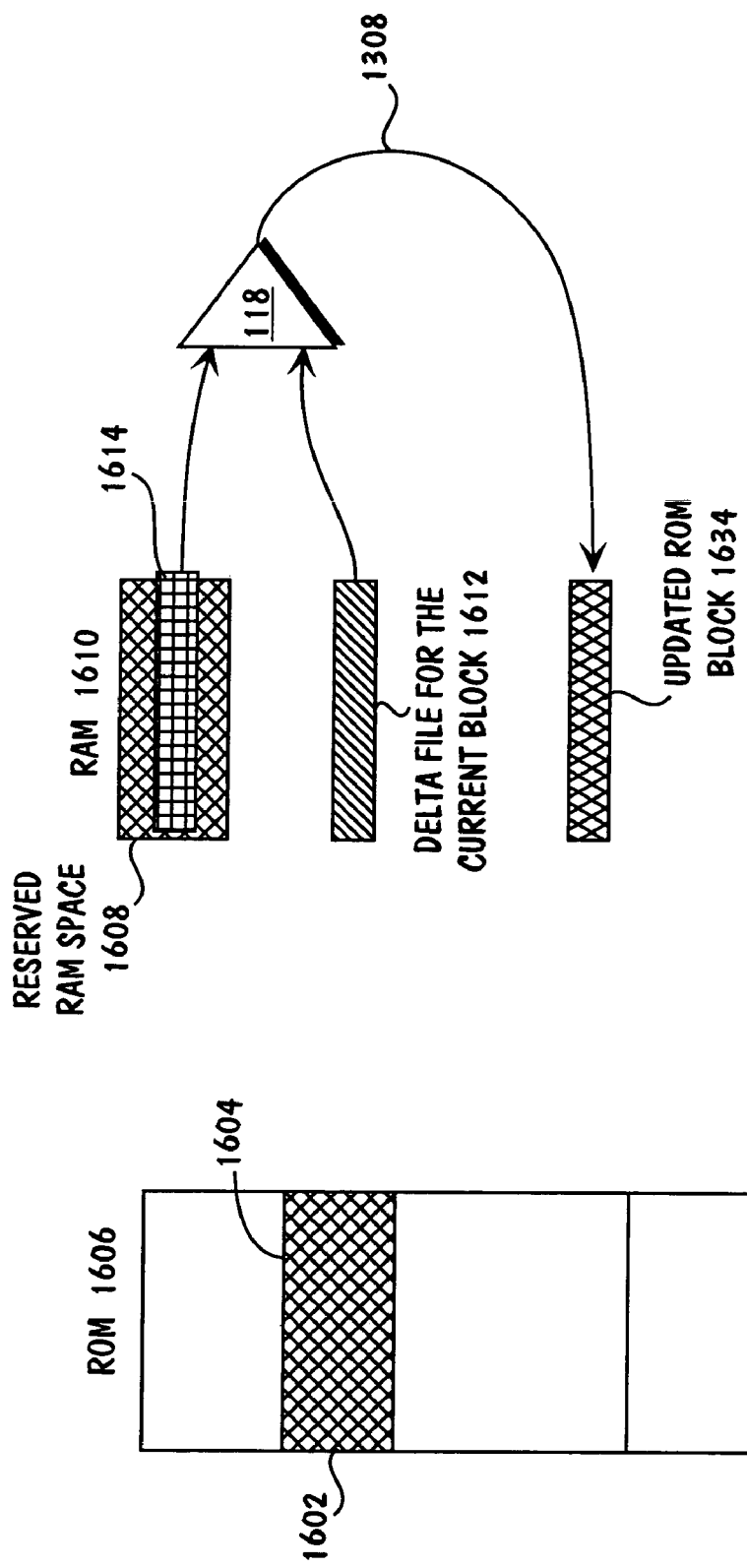
Figure 18:
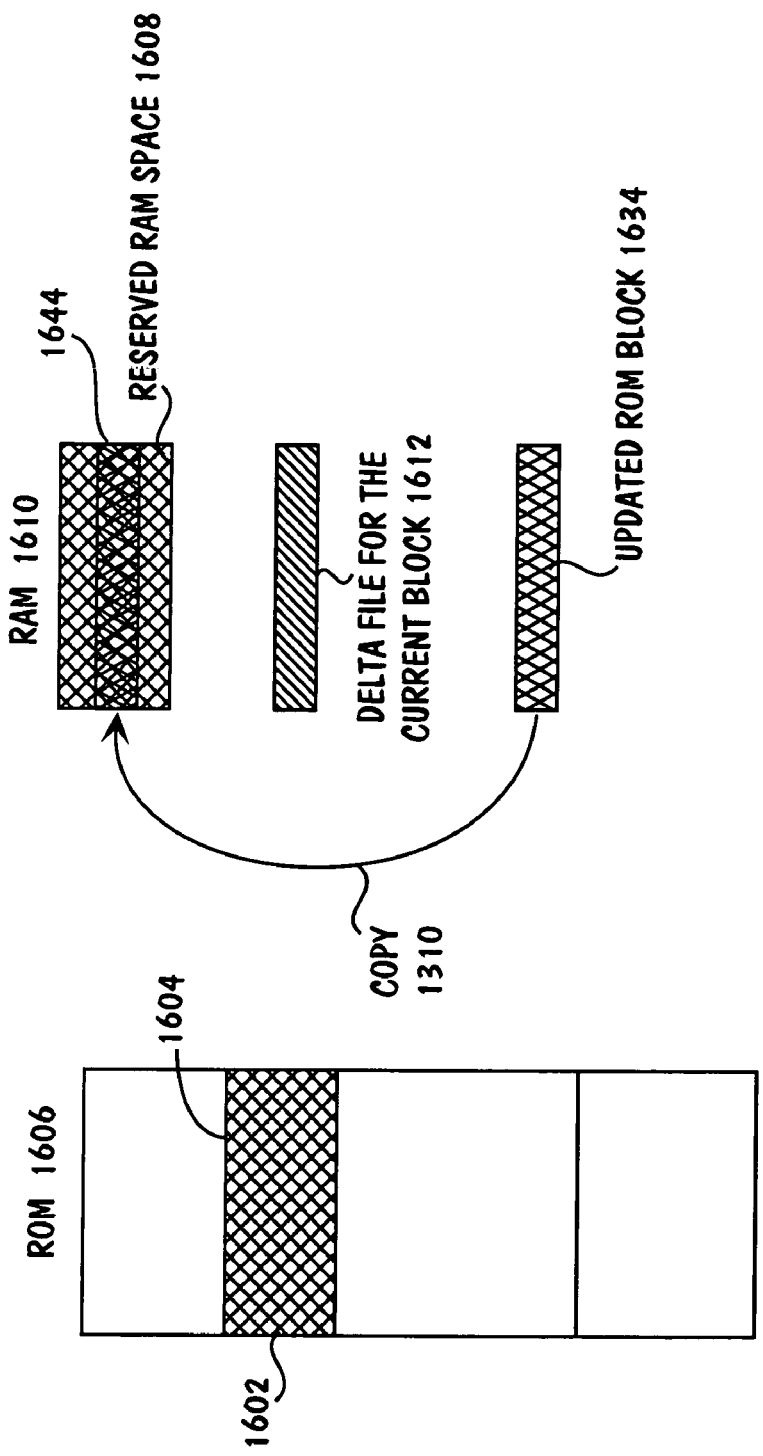

FIGS. 14–19, along with FIG. 13, provide an example for updating the communication protocol using reserved RAM, but the embodiment is not so limited. The upgrade client begins by copying 1302 the original EBSC 1602 or file targeted for update from its original location 1604 in ROM 1606 into a reserved location 1608 in RAM 1610 (FIG. 14). The upgrade client then downloads 1304 the delta file 1612 corresponding to one block 1614 of the target EBSC 1602 from the upgrade server into the client device RAM 1610 (FIG. 15). The block 1614 of the target EBSC 1602 is then read 1306 from the reserved RAM 1608 and copied as a block 1624 into the device RAM 1610 (FIG. 16). The file updating algorithm of the upgrade client generates or recovers 1308 a copy of the new EBSC block 1634 from the original EBSC block 1614 in reserved RAM 1608 using the delta file block 1612 (FIG. 17). The recovered EBSC block 1634 is written over the original EBSC block 1624 in RAM 1610. Following writing of the new EBSC block 1634 to RAM 1610, the new EBSC block 1634 is written back 1310 to the appropriate memory locations in the reserved RAM block 1608 (FIG. 18).

Operation now checks to determine whether all blocks of the delta file have been downloaded and processed 1512. If blocks remain to be processed, operation returns to download the delta file corresponding to the next block of the target EBSC from the upgrade server, and continues.

Figure 19:
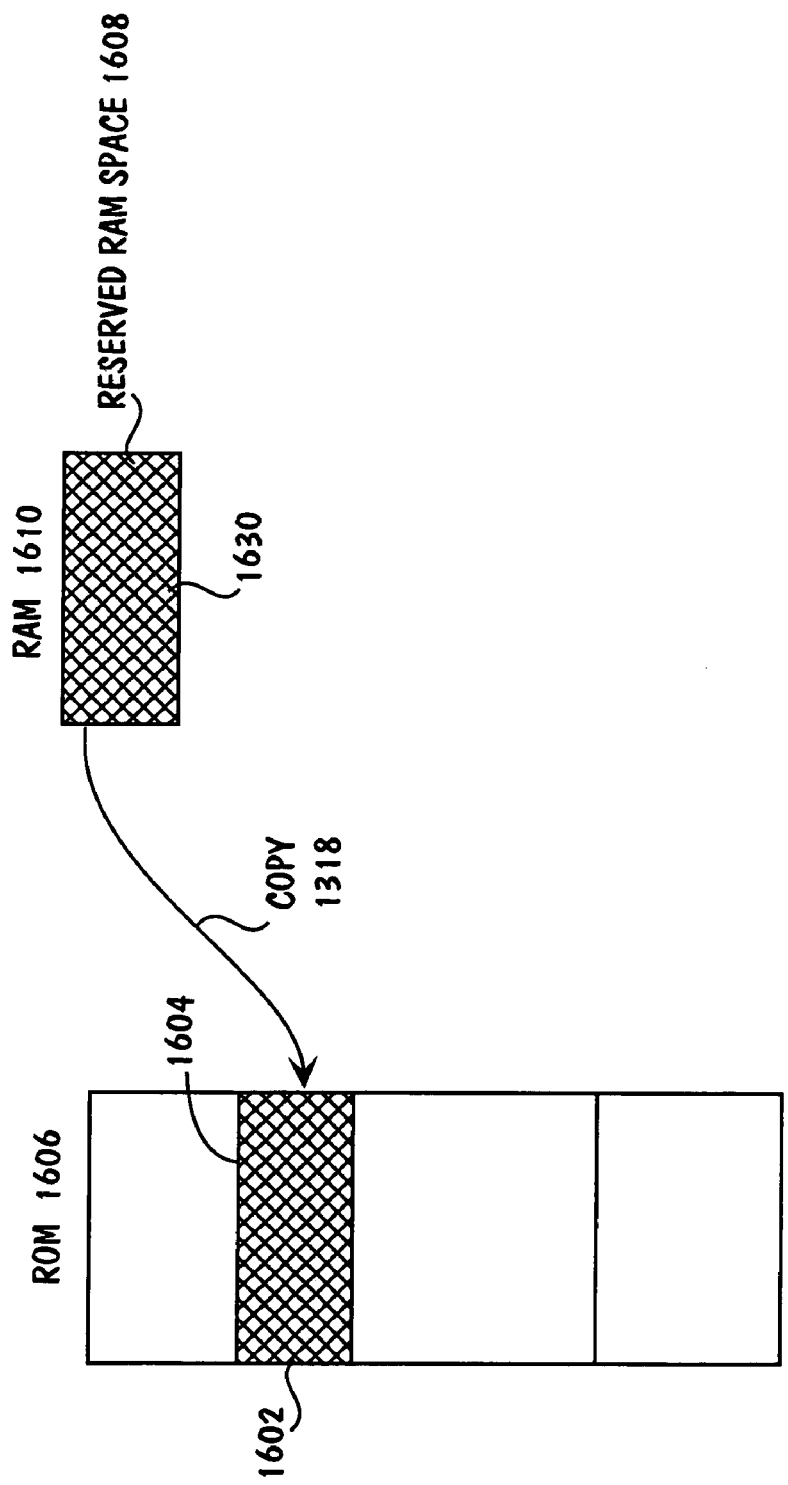

Following processing of all blocks of the delta file, the NewComponentReady flag in the ROM is set to 1, and the upgrade client restarts the telephone. During the restart boot process, in the IPL mode, the NewComponentReady flag is checked. If this flag is set to 1, then the boot code will not initialize the reserved RAM location. Also, the upgrade client writes 1318 or copies the new EBSC 1630 from the reserved RAM location 1608 over the corresponding original EBSC 1602 in the original ROM location 1604 (FIG. 19). Following or simultaneous with this copy operation, the NewComponentReady flag is set to 0. The boot process then continues to initialize all other device applications, including the OS, and subsequently switches the client device to the telephone mode.

Note that this update process has minimal impact on the user because the involved components are not required to cease operation during the update. Regarding failure of the update process during the update, failures during downloading and processing of delta file blocks have no affect on device operations, including operation of the particular EBSC targeted for update. In an embodiment, the device presents the user with a failure message, and the user may re-command the upgrade client to perform the update at another time.

In the event of a failure while the upgrade client is writing the new EBSC block over the original EBSC block in the original ROM location, the original EBSC block is recovered using a backup copy of the original EBSC block. The recovery includes reading the backup copy of the original EBSC block from a location in the host device memory, and writing the backup copy to the original ROM location. Following a failure during the write process the host device may automatically re-initiate the failed update at a future time or, alternatively, the host device may present a failure message to the user and enable the user to re-command the upgrade client to perform the update at a future time.

Figure 20:
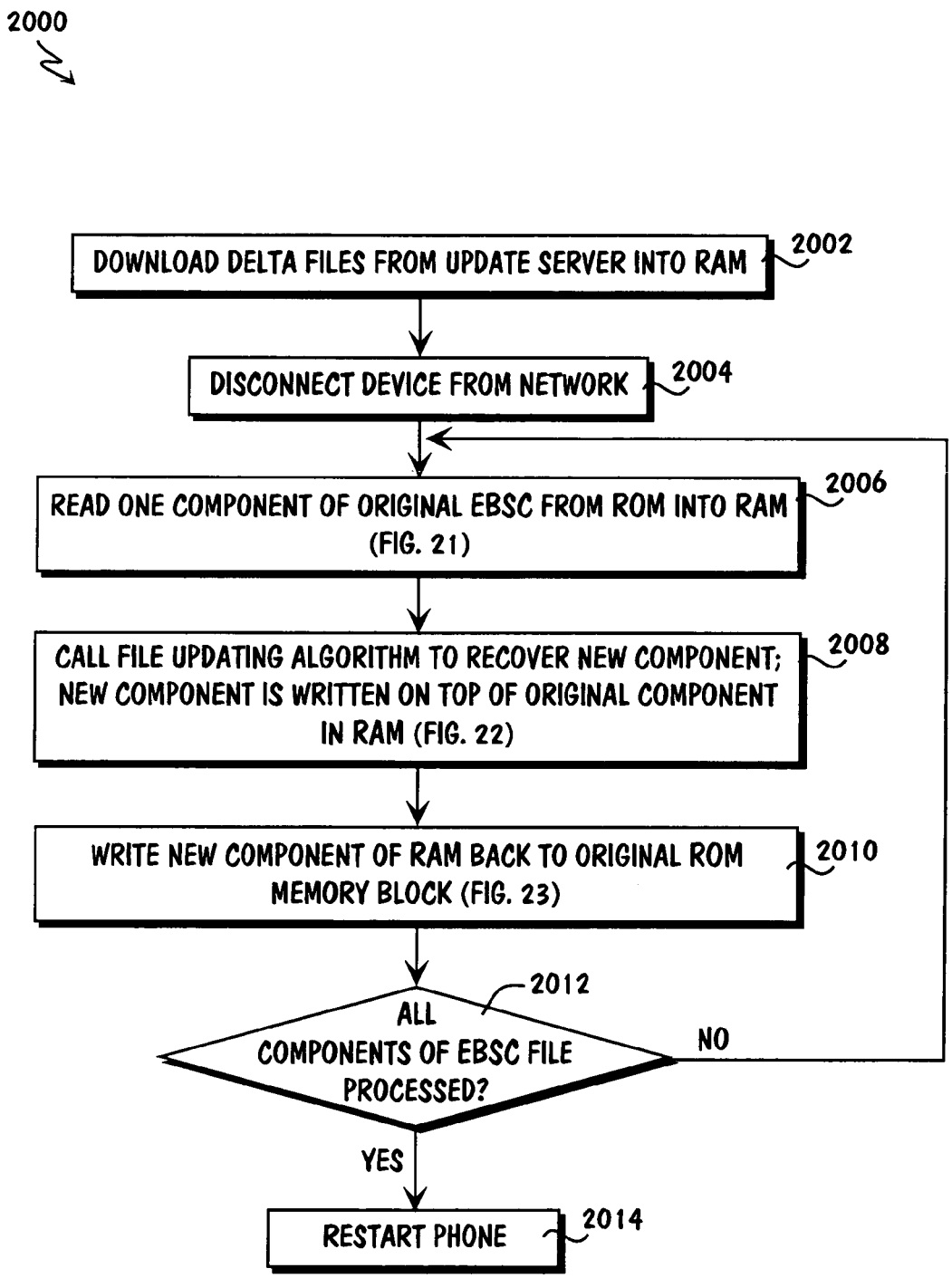
FIG. 20 is a flow diagram of a method for updating the communication protocol in the absence of reserved device read-only memory (ROM) or RAM, under an embodiment.
Figure 21:
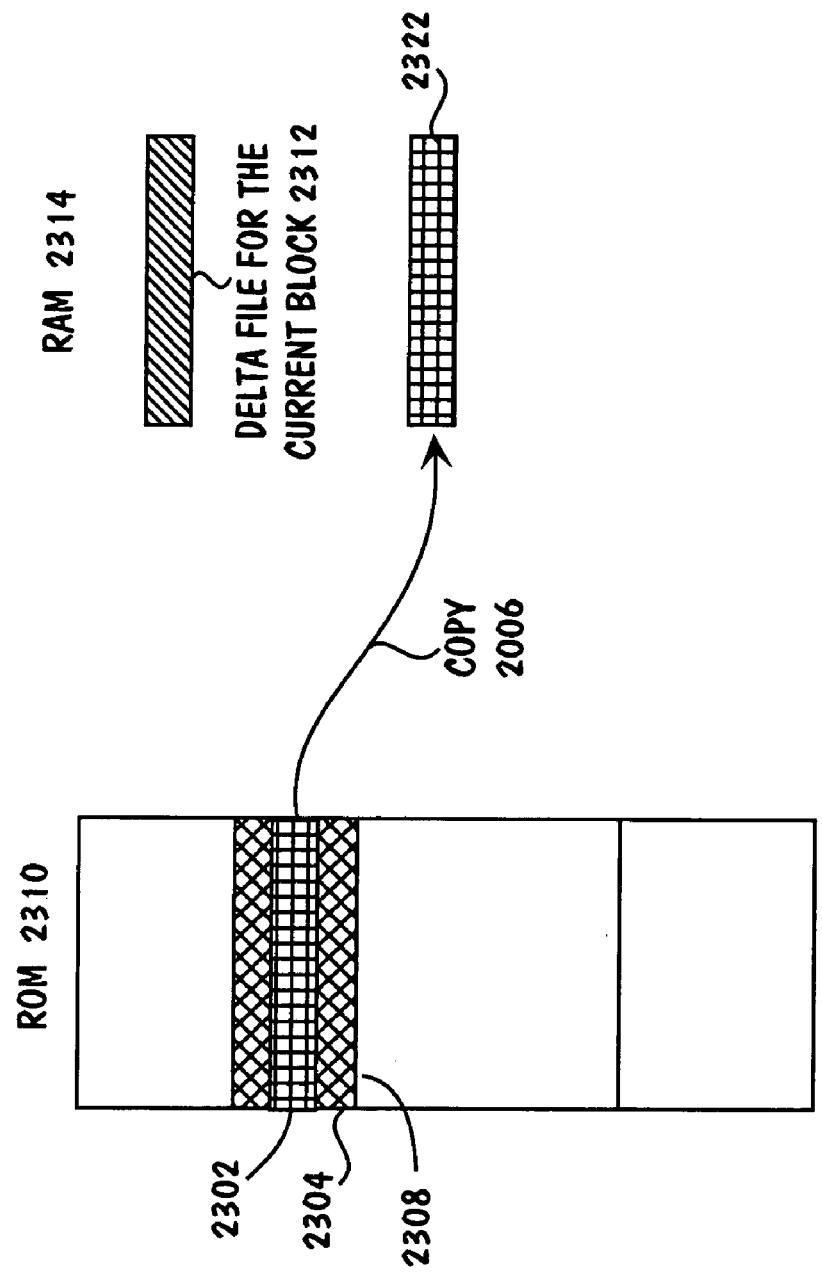
FIGS. 21–23 are block diagram depictions of the particular operations of the flow diagram of FIG. 20.
Figure 22:
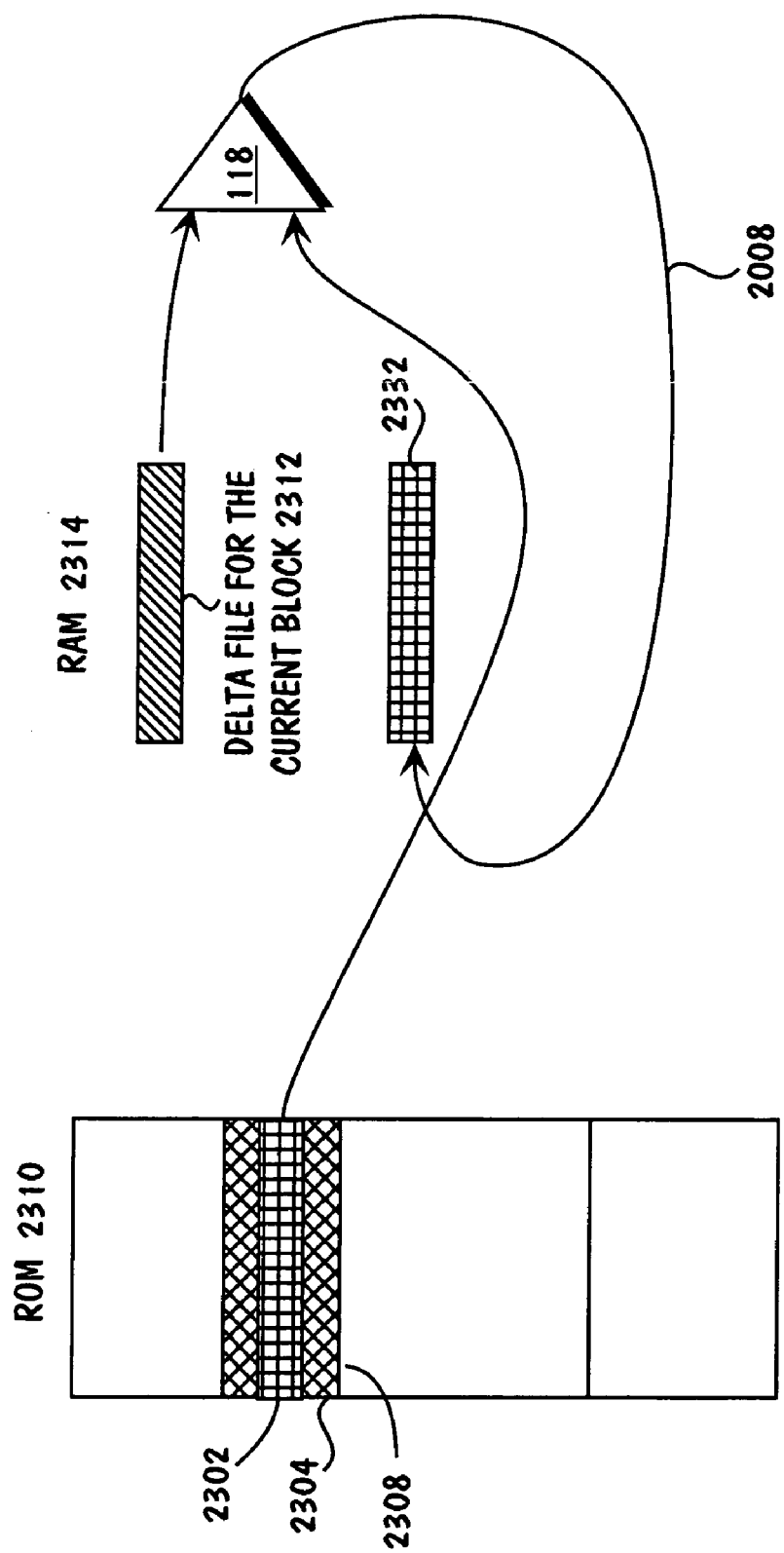
Figure 23:
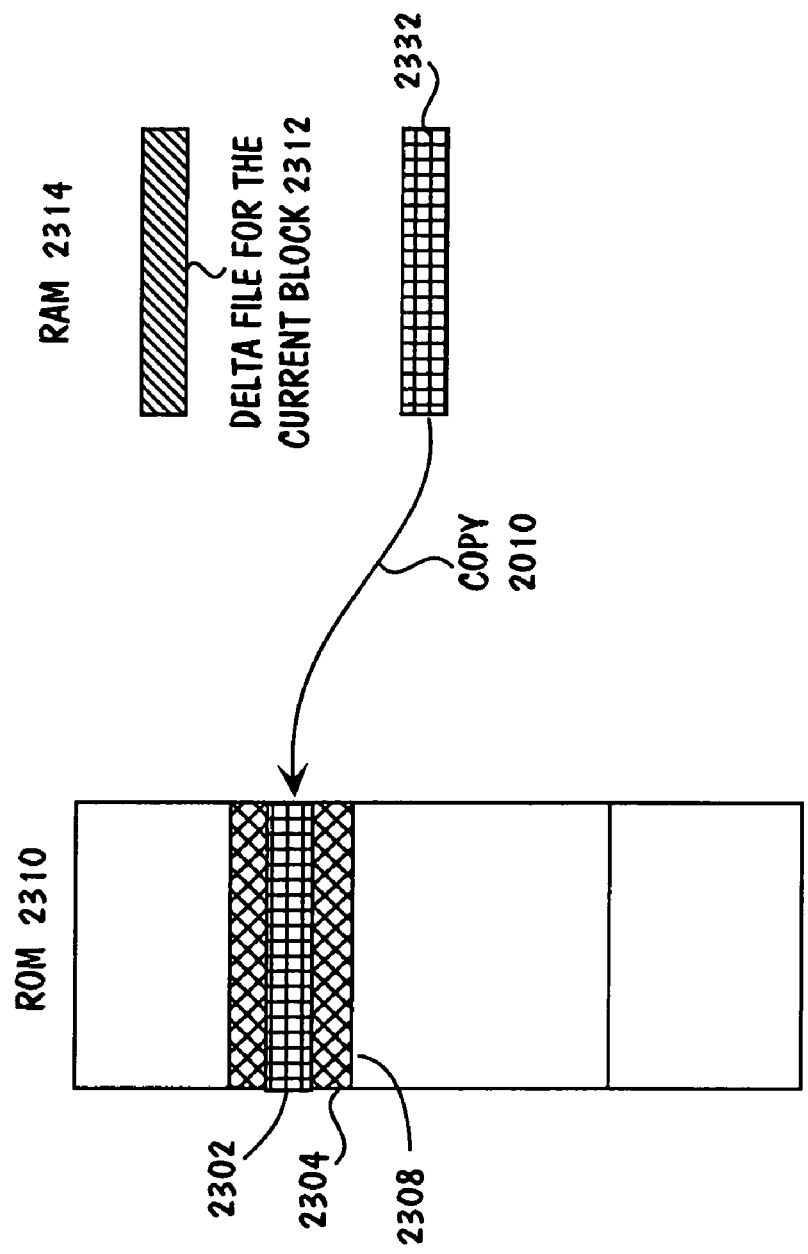

FIG. 20 is a flow diagram 2000 of a method for updating the communication protocol in the absence of reserved ROM or reserved RAM, under an embodiment. FIGS. 21–23 are block diagram depictions of particular operations of the flow diagram 2000.

With reference to FIG. 20, the upgrade client begins by downloading all delta files from the update server into device RAM, 2002, where each delta file corresponds to one block or segment of the original file that is targeted for update. The device is then disconnected from the associated network to prevent a situation in which the communication protocol is in use during an attempted update, 2004.

A block of the original EBSC or file undergoing update is read from the original location in device ROM and written as a block into RAM, 2006. The file updating algorithm of the upgrade client generates or recovers a copy of the new EBSC block from the EBSC block in RAM using the corresponding delta file block, 2008. The new EBSC block is written over the original EBSC block in RAM. The new EBSC block is then written from the location in RAM back to the corresponding memory locations in ROM, 2010.

The upgrade client now determines whether all blocks of the target EBSC have been processed, 2012. If blocks remain to be processed, operation returns to read the blocks of the original EBSC from ROM into RAM, 2006, and continues until all blocks of the EBSC have been processed and updated. The upgrade client then restarts the telephone, 2014.

FIGS. 21–23, along with reference to FIG. 20, provide an example of communication protocol updating, but the embodiment is not so limited. The upgrade client begins by downloading the delta files 2312 from the update server into device RAM 2314, where each delta file corresponds to one block or segment of the original file that is to be updated. Following disconnection of the host device from the associated network, a block 2302 of the original EBSC or file 2304 undergoing update is read 2006 from the original location 2308 in ROM 2310 and written as a block 2322 into RAM 2314 along with the corresponding delta file block 2312 (FIG. 21). The file updating algorithm of the upgrade client generates or recovers 2008 a copy of the new EBSC block 2332 from the EBSC block 2322 in RAM 2314 using the corresponding delta file block 2312 (FIG. 22). The new EBSC block 2332 is written over 2008 the original EBSC block 2322 in RAM 2314.

Following writing of the new EBSC block 2332 to RAM 2314, the new EBSC block 2332 is written back 2010 to the corresponding memory locations in the device ROM 2310 (FIG. 23). The upgrade client now determines whether all blocks of the target EBSC have been processed 2012. If blocks remain to be processed, operation returns to read the blocks of the original EBSC from ROM into RAM, and continues until all blocks of the EBSC have been processed and updated. The upgrade client then restarts the telephone.

Figure 24:
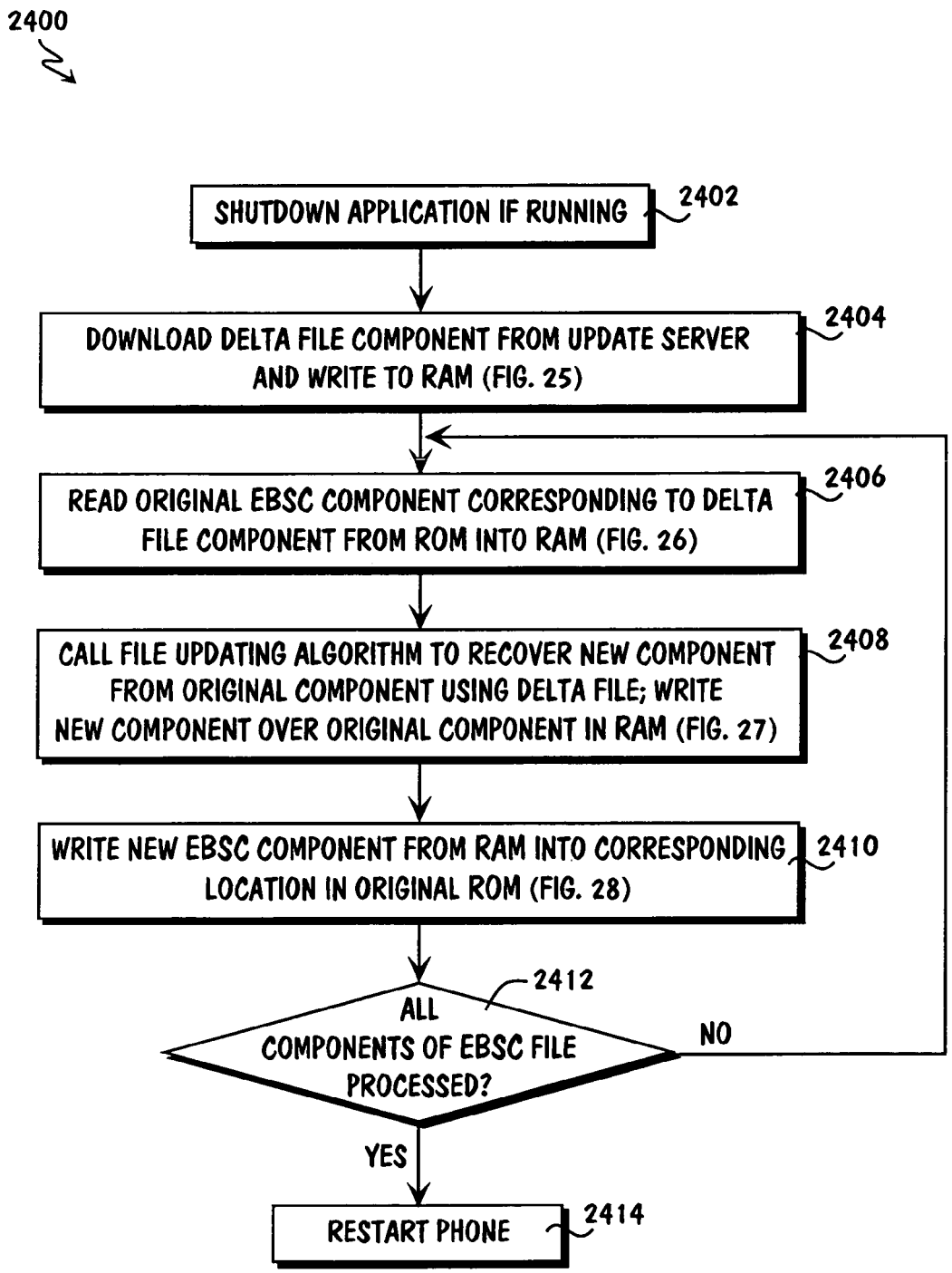
FIG. 24 is a flow diagram of a method for updating non-critical EBSCs, under an embodiment.

FIG. 24 is a flow diagram 2400 of an on-line method for updating non-critical EBSCs, under an embodiment. FIGS. 25–28 are block diagram depictions of particular operations of the flow diagram 2400.

With reference to FIG. 24, the upgrade client begins by shutting down the EBSC targeted for update if the associated application is running, 2402. The upgrade client then downloads the delta file block from the update server into device RAM, where the delta file block corresponds to one block of the original EBSC or file targeted for update, 2404.

A block of the original EBSC targeted for update is read from the original location in ROM and written into RAM, 2406. The file updating algorithm of the upgrade client generates or recovers a copy of the new EBSC block from the original EBSC block using the delta file component, 2408; the copy of the recovered EBSC block is written over the corresponding original EBSC block in RAM. The new EBSC block is then written from RAM back to the memory locations in ROM corresponding to the block of the original EBSC, 2410.

The upgrade client now determines whether all blocks of the target EBSC have been processed, 2412. If blocks remain to be processed, operation returns to download the next delta file block from the upgrade server into device RAM, 2404, and continues until all blocks of the target EBSC have been processed and updated. The upgrade client then restarts the telephone, 2414.

Figure 25:
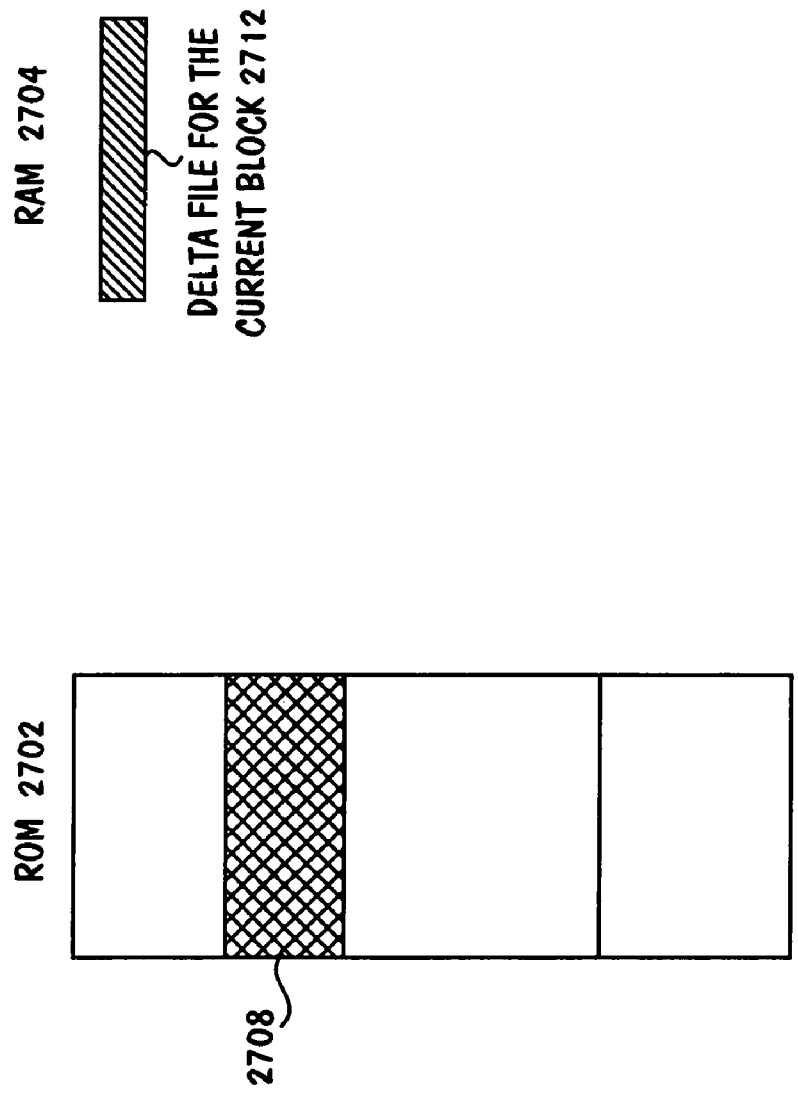
FIGS. 25–28 are block diagram depictions of particular operations of the flow diagram of FIG. 24.

FIGS. 25–28, along with reference to FIG. 24, provide an example of this update method, but the embodiment is not so limited. After terminating operation of the application associated with the EBSC targeted for update, when the application is running, the upgrade client downloads the delta file block 2712 from the update server into device RAM 2704; the downloaded delta file block 2712 corresponds to one block of the original EBSC 2708 or file that is to be updated (FIG. 25).

Figure 26:
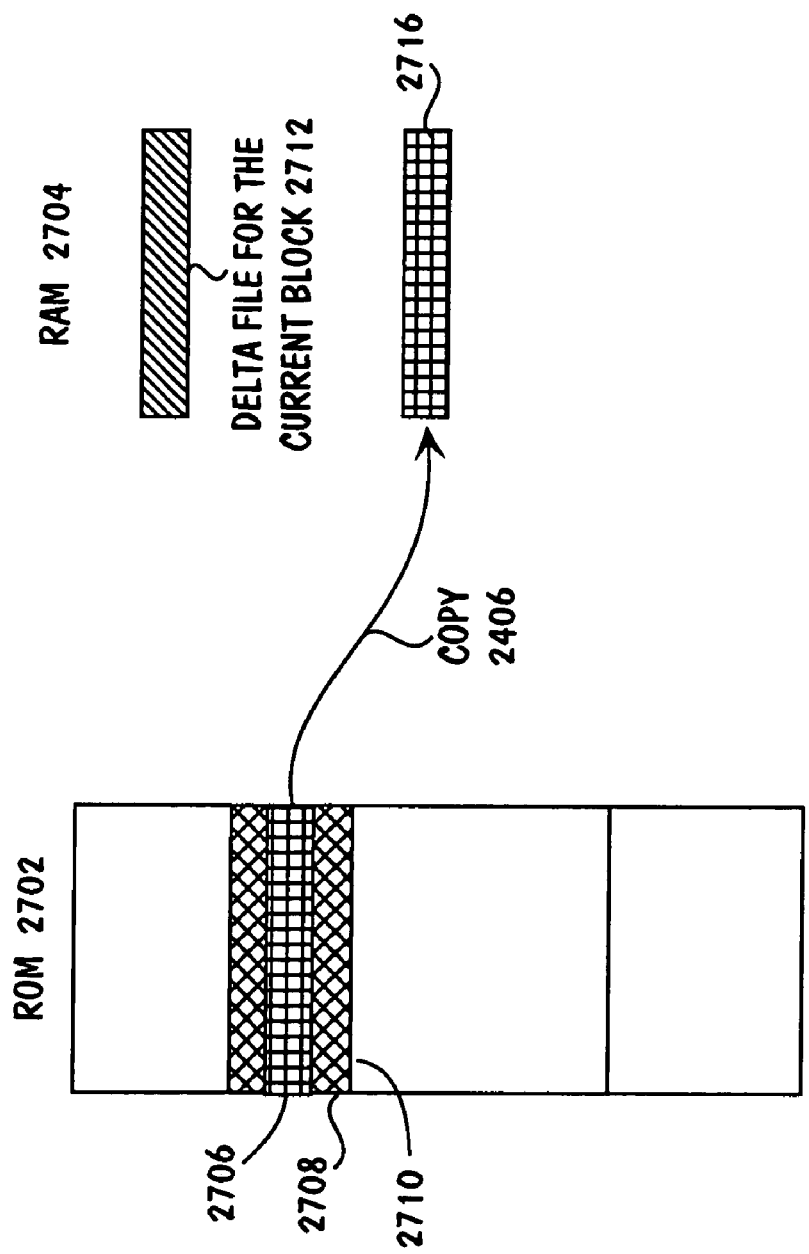
Figure 27:
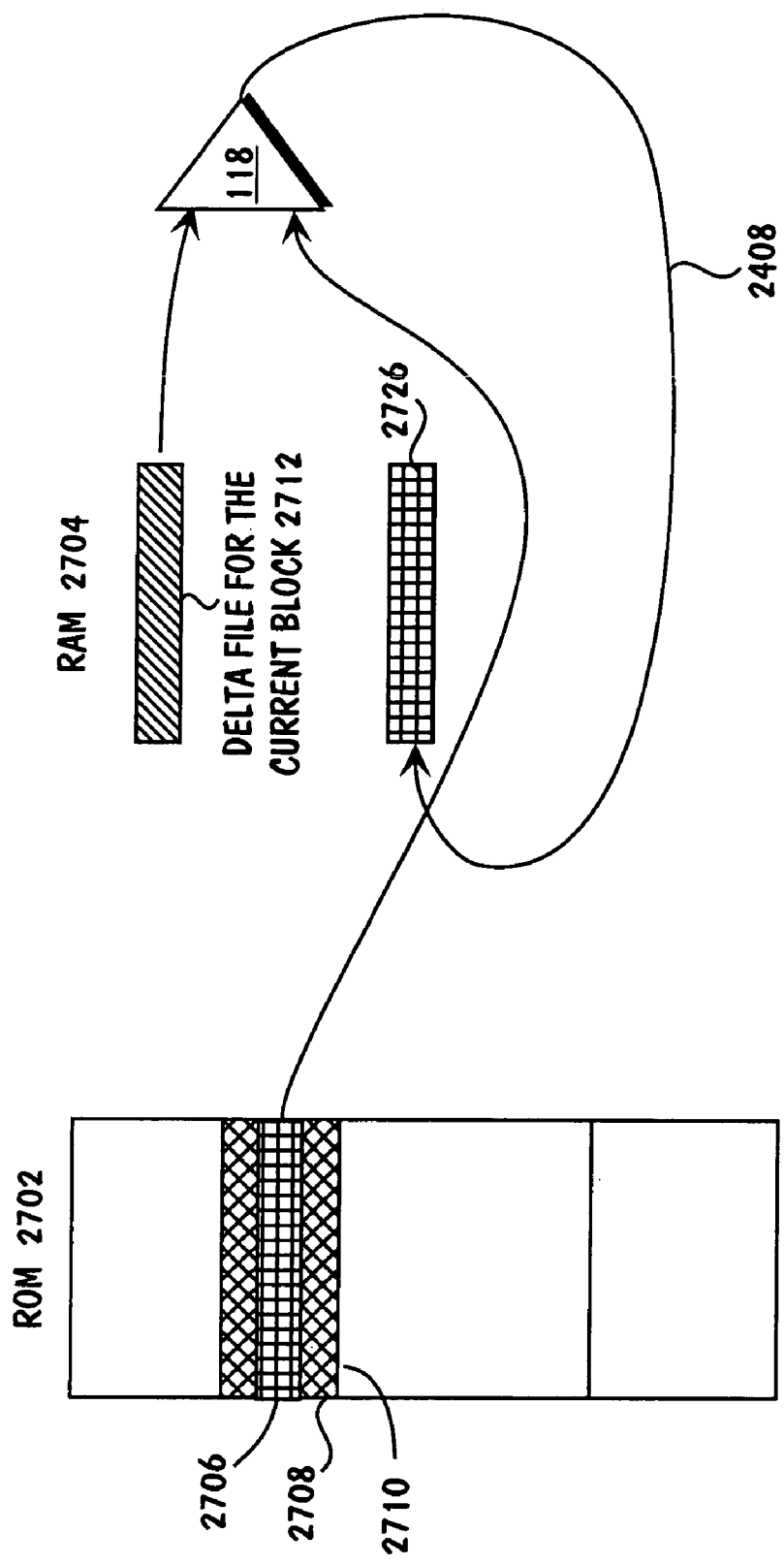
Figure 28:
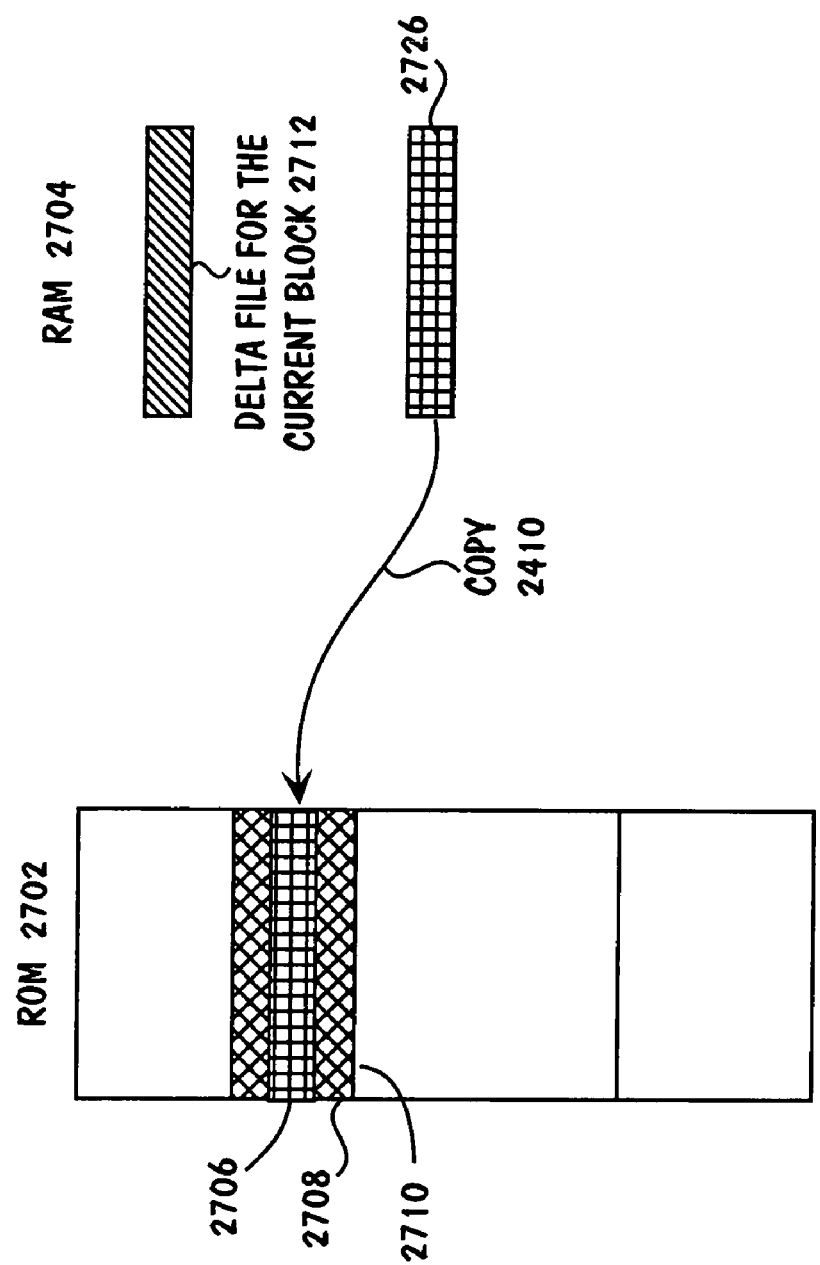

A block 2706 of the original EBSC 2708 undergoing update is read 2406 from the original location 2710 in ROM 2702 and written as a block 2716 into RAM 2704 (FIG. 26). The file updating algorithm 118 of the upgrade client generates or recovers 2408 a copy of the new EBSC block 2726 from the original EBSC block 2706 using the delta file component 2712 (FIG. 27). The copy of the recovered EBSC block 2726 is written over the original EBSC block 2716 in RAM 2704. Following writing of the new EBSC block 2726 to RAM 2704, the new EBSC block 2726 is written back 2410 to the memory locations in ROM 2702 corresponding to the block 2706 of the original EBSC 2708 (FIG. 28).

The upgrade client now determines whether all blocks of the target EBSC have been processed. If blocks remain to be processed, operation returns to download the next delta file block from the upgrade server into device RAM 2704, and continues until all blocks of the target EBSC 2708 have been processed and updated. The upgrade client then restarts the telephone.

Regarding failure recovery, the upgrade client tracks the update process using the status data in the ROM. When the update fails, the upgrade client prevents the partially updated file from being used, thereby preventing a crash of the device systems. The user can still use other applications on the phone and can choose to update the component at a later time.

As described above, revision of EBSCs requires the writing of new and updated EBSCs to memory locations containing the original EBSC. Often, the new EBSC will not be exactly the same size as the existing EBSC. The upgrade client of an embodiment provides device memory management options including dynamic addressing and static addressing of upgradeable EBSCs.

The dynamic addressing of upgradeable EBSCs supports changing both the start address and size of an upgradeable EBSC or EBSC group during each update. This dynamic addressing uses a vector table that is saved in a reserved ROM area of the client device. In further support of dynamic addressing, a library of the upgrade client provides a set of application program or programming interfaces (APIs); upgradeable EBSCs use these APIs to call other EBSCs. Furthermore, dynamic addressing increases the efficiency of ROM utilization and device memory map design. Also, dynamic addressing supports faster update processing with a lower probability of update failures.

The file updating algorithm of an embodiment uses checksum error correction coding to detect any corruption of a transmitted delta file, original EBSC or the calculated new EBSC, but is not so limited. The length of the checksum is one or two bytes, and the checksum is placed at the end of the delta file, but the embodiment is not so limited. The checksum is the two's complement of the byte that represents the sum of all the bytes in the delta file except the last one. In this way, summing all the bytes in an error-free delta file provides a result equal to zero. Alternative embodiments of the file updating algorithm may use Cyclic Redundancy Check (CRC) to detect any corruption of a transmitted delta file.

Aspects of the invention may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the invention include: microcontrollers with memory (such as electronically erasable programmable read only memory (EEPROM)), embedded microprocessors, firmware, software, etc. Furthermore, aspects of the invention may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," and words of similar import, when used in this application, shall refer to this application as a whole and not to any particular portions of this application.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other processing systems and communication systems, not only for the file updating described above.

The elements and acts of the various embodiments described above can be combined to provide further embodiments. These and other changes can be made to the invention in light of the above detailed description.

All of the above references and United States patents and patent applications are incorporated herein by reference. Aspects of the invention can be modified, if necessary, to employ the systems, functions and concepts of the various patents and applications described above to provide yet further embodiments of the invention.

In general, in the following claims, the terms used should not be construed to limit the invention to the specific embodiments disclosed in the specification and the claims, but should be construed to include all processing systems that operate under the claims to provide a method for file differencing and updating. Accordingly, the invention is not limited by the disclosure, but instead the scope of the invention is to be determined entirely by the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

I claim:

1. A system for updating electronic files, comprising:

two or more differencing systems, wherein each differencing system includes a first component of a byte-level file differencing and updating system that generates difference flies using an operation array to code byte-level differences between original files and updated files;

at least one server of a communication service provider coupled among the differencing systems and two or more portable communication devices, wherein the server, receives the difference files and generates messages to each of the portable communication devices hosting original files corresponding to the difference file, wherein the messages inform users of available updates to hosted files, receives requests for the updates from users and, in response, provides the difference file to the requesting portable communication devices; and wherein each of the portable communication devices includes a second component of the byte-level file differencing and updating system and is configured to, receive at least one block of the difference file and store the difference file block in a first memory area;

write a copy of at least one block of the original file from an original memory area to a second memory area, wherein the original file block corresponds to the difference file block;

generate a copy of at least one block of the new file using the stored difference file block and the copy of the original file block, wherein the new file block corresponds to the original file block;

write the generated copy of the new file block to a third memory area; and update the original file block by writing the copy of the new file block over the corresponding original file block in the original memory area.

* * * * *